United States Patent
Yamashita et al.

(10) Patent No.: US 8,336,942 B2
(45) Date of Patent: Dec. 25, 2012

(54) STRUCTURE FOR STORING SEAT FOR AUTOMOBILE

(75) Inventors: Hajime Yamashita, Hamamatsu (JP); Yoshihide Itou, Toyota (JP); Yoshitaka Ootake, Toyota (JP); Fukuo Ogiso, Toyota (JP); Tamotsu Keinaga, Okazaki (JP); Ko Ishikawa, Toyota (JP); Hideyuki Kato, Toyota (JP)

(73) Assignees: Toyota Boshoku Kabushiki Kaisha, Aichi-Ken (JP); Toyota Jidosha Kabushiki Kaisha, Aichi-Ken (JP)

( * ) Notice: Subject to any disclaimer, the term of this patent is extended or adjusted under 35 U.S.C. 154(b) by 617 days.

(21) Appl. No.: 12/525,231

(22) PCT Filed: Jan. 10, 2008

(86) PCT No.: PCT/JP2008/050184
§ 371 (c)(1),
(2), (4) Date: Sep. 21, 2009

(87) PCT Pub. No.: WO2008/093522
PCT Pub. Date: Aug. 7, 2008

(65) Prior Publication Data
US 2010/0032976 A1 Feb. 11, 2010

(30) Foreign Application Priority Data

Jan. 31, 2007 (JP) .................. 2007-020727
Jan. 31, 2007 (JP) .................. 2007-020736

(51) Int. Cl.
*B60J 7/00* (2006.01)
(52) U.S. Cl. .................................. 296/65.03
(58) Field of Classification Search ............... 296/65.01, 296/65.03, 65.13; 297/14, 15, 378.1
See application file for complete search history.

(56) References Cited

U.S. PATENT DOCUMENTS

| 5,871,255 | A * | 2/1999 | Harland et al. ............ 297/257 |
| 6,012,755 | A * | 1/2000 | Hecht et al. ............. 296/65.03 |
| 6,279,982 | B1 | 8/2001 | Nishimura et al. |
| 7,137,663 | B2 | 11/2006 | Tsujibayashi et al. |
| 2004/0227386 | A1 | 11/2004 | Tsujibayashi et al. |
| 2006/0097538 | A1 | 5/2006 | Villeminey |
| 2007/0013204 | A1 | 1/2007 | Yajima et al. |
| 2008/0157579 | A1 | 7/2008 | Yajima et al. |

(Continued)

FOREIGN PATENT DOCUMENTS
JP 10-338066 12/1998
(Continued)

OTHER PUBLICATIONS

English language Abstract of JP 11-321411, Nov. 24, 1999.
(Continued)

*Primary Examiner* — Joseph Pape
(74) *Attorney, Agent, or Firm* — Greenblum & Bernstein, P.L.C.

(57) ABSTRACT

A guide structure for guiding a removable seat to move between a support base and a storage container is constituted by a joint portion between a lower face of a seat cushion of the seat and the support base and is constituted as a storing structure of the storage container. And, an arrangement relationship between both members is constituted to be such an arrangement relationship that the removable seat can also be guided to move to the guide structure constituted at the storage container in a state where the removable seat is guided to move by the guide structure constituted at the removable seat.

14 Claims, 25 Drawing Sheets

U.S. PATENT DOCUMENTS

2009/0243323 A1  10/2009  Mitsuhashi

FOREIGN PATENT DOCUMENTS

| JP | 11-151960 | 6/1999 |
| JP | 11-230138 | 8/1999 |
| JP | 2000-71831 | 3/2000 |
| JP | 2001-47917 | 2/2001 |
| JP | 3309800 | 5/2002 |
| JP | 2003-54295 | 2/2003 |
| JP | 2004-338576 | 12/2004 |
| WO | 2004/071801 | 8/2004 |

OTHER PUBLICATIONS

English language Abstract of JP 2000-71831, Mar. 7, 2000.
English language Abstract of JP 2004-338576, Dec. 2, 2004.
English language Abstract of JP 2003-54295, Feb. 26, 2003.
English language Abstract of JP 10-338066, Dec. 22, 1998.
English language Abstract of JP 11-151960, Jun. 8, 1999.
English language Abstract of JP 2001-47917, Feb. 20, 2001.
English language Abstract of JP 11-230138, Aug. 27, 1999.

* cited by examiner

STRUCTURE FOR STORING SEAT FOR AUTOMOBILE

TECHNICAL FIELD

The present invention relates to a structure for storing a seat for an automobile. In details, the present invention relates to a structure for storing a seat, which is arranged attachably and detachably on a floor within an automobile compartment, into a storage container installed on the floor when the seat is detached.

BACKGROUND ART

Some of seats for automobiles are detachable. For example, according to some seats practically used, seats of a second row arranged within an automobile compartment are formed to be divided into three in a widthwise direction, and the central seat of them is made to be attachable to and detachable from a floor as a removable seat. In this case, the central removable seat is normally formed to be narrower in width than the seats on both sides. Further, in a so-to-speak bench seat state, in which the central seat is aligned with both seats on the left and right sides, the seats can be utilized as three passenger's seats, and in a state of removing the central seat, the seats are made to be two passenger's seats by the seats on both left and right sides, while the passenger can walk through rearward by passing the portion for the central seat. Therefore, improvement in convenience of the passenger within the automobile compartment is achieved.

Meanwhile, the removed central seat is stored by being taken out from inside of the automobile chamber to the outside, or stored by providing a storing place within the compartment. Generally, in many cases, the storing place is provided within the compartment from a viewpoint of ensuring a state of being attachable and detachable at any time.

In the case that the storing place of the seat for enabling attachment and detachment is provided within the compartment, the storing place is provided at a lower portion of a floor face, or a storage container is installed on the floor face within the automobile compartment. A storing structure disclosed in Japanese Patent No. 3309800 is its example.

Further, a structure of a seat attaching and detaching mechanism enabling the removable seat to be attachable to and detachable from the floor is disclosed, for example, in Japanese Patent Publication JP-A-2004-338576. According to its specific construction, lower faces of left and right seat legs arranged on a lower side of a seat cushion are provided with a left and right pair of lock mechanisms, which can be engaged to be locked by strikers fixedly mounted to the floor, at two portions on a vehicle front side and a vehicle rear side. The front and rear lock mechanisms are respectively connected to an operation lever arranged at an upper face of a bottom frame that receives the seat cushion, the front and rear lock mechanisms are brought into a lock release state by operating the operation lever, and the central seat can be attached to and detached from the floor by releasing engagement with the strikers disposed on the floor. Further, a striker receiving opening of the rear side lock mechanism is opened downwardly, and a striker receiving opening of the front side lock mechanism is opened forwardly.

In the case that the attachable and detachable seat is stored to any place within the automobile compartment as described above, in order to move the detached seat to the storing place, the movement is carried out by laying a guide member such as a rail or the like from the seat installing position to the storing position. With this, the detached seat is guided by the rail to be reliably guided to move to the storing place.

However, in the case that the detached seat is guided by the guide member such as a rail or the like as described above, it is necessary to continuously provide the guide member such as a rail or the like between the position of installing the seat and the storing position, and particularly in the case that a position of arranging the rail is disposed on the floor face, it may cause a problem that the rail constitutes an obstacle when the passenger moves, or an outlook of inside of the compartment is poor.

Further, with regard to the seat attaching and detaching mechanism for enabling the removable seat attachable and detachable to and from the floor, the following various problems may exist. That is, the lock mechanisms are incorporated both on the front side and the rear side as engaging means, and therefore, increase in the number of parts and complication of the constitution are unavoidable. Although striker releasing directions of the front and rear lock mechanisms (opening directions of striker receiving inlets) differ from each other, there exists no special significance in this fact itself. Further, the lock mechanisms are provided on the side of the seat, and therefore, a problem may be caused that the weight of the seat is increased, and a large force is necessary for the operation of attaching or detaching the seat.

Thus, there is a need in the art to enable elimination of installation of the guide means such as a rail or the like on a path between a seat installation position and a storage position by providing means for guiding a detached removable seat from the seat installation position to the storage position to the a seat installing member and means for storing the seat themselves.

SUMMARY OF THE INVENTION

One aspect according to the present invention can include a structure for storing a seat for an automobile, which includes a removable seat is installed attachably and detachably to and from a seat installing member arranged on a floor within an automobile compartment, a storage container capable of storing the removable seat is installed at a position within the automobile compartment away from a position of installing the removable seat, a guide structure for guiding the removable seat to move in a direction for moving to store into the storage container is constituted between the removable seat and the seat installing member, the storage container is constituted with a guide structure for guiding to move the removable seat between the storage container and the removable seat when the removable seat is store, and an arrangement relationship between the seat installing member and the storage container within the automobile compartment is constituted to be such an arrangement relationship that the removable seat can be positioned to straddle between the two guide structures, so that the removable seat can also be guided to move to the guide structure constituted at the storage container in a state where the removable seat is guided to move by the guide structure constituted at the removable seat.

Therefore, the guide structure for guiding the detached removable seat to move is constituted by the seat installing member and the storage container themselves. And the arrangement relationship between the seat installing member and the storage container is constituted to be such an arrangement relationship that the removable seat can also be guided to move to the guide structure constituted at the storage container in a state where the removable seat is guided to move by the guide structure constituted at the removable seat. With this, the removable seat detached from the seat installing member can be guided to move by the guide structure constituted at the storage container while being guided to move by the guide structure constituted between the seat and the seat installing member. Therefore, it is not necessary to install a guide means such as a rail on a path from the installing position of the removable seat to the storage position.

Further, the storage structure of the seat for the automobile of the above basic means of the present invention described above preferably may be the following means.

First, the removable seat is an auxiliary seat disposed at a side portion of a basic seat, the auxiliary seat is constituted by a seat cushion and a seat back, the seat back is configured to be able to be folded onto the seat cushion, the seat cushion of the auxiliary seat is installed attachably and detachably to and from the seat installing member formed to be integrally movable with the basic seat, and the guide structure is constituted between the seat cushion of the auxiliary seat and the seat installing member.

According to this preferable means, the removable seat is the auxiliary seat disposed at the side portion of the basic seat. In addition, the auxiliary seat is installed attachably and detachably to and from the seat installing member formed to be integrally movable with the basic seat. Therefore, the construction of the auxiliary seat as the removable seat can be simplified in comparison with the case where the basic seat and the auxiliary seat are installed on the floor independently of each other.

Further, it may be preferable that at least two rows of seats are arranged in front and rear directions within the automobile compartment, side seats are respectively disposed in left and right directions at each of the front and rear rows, the removable seat is disposed at a position between the left and right side seats of the rear row, the storage container is disposed between the left and right side seats of the front row, and a position in a vehicle width direction of the removable seat disposed at the rear row and a position in the vehicle width direction of the storage container disposed at the front row are set to be the same positional relationship.

According to this preferable means, the storage container is disposed between the left and right side seats. Therefore, the arrangement position of the storage container may be set to a position that does not prevent a passenger from getting on and off. In addition, the arrangement positions of the removable seat and the storage container are set to be the state having the same positional relationship as viewed in the vehicle width direction. Therefore, the guide structures constituted at the seat installing member and the storage container may be constructed to be relatively simple structures in comparison with the case that their arrangement positions are different arrangement positions in the vehicle width direction.

Further, in the above means, it may be preferable that an inlet opening portion formed at the storage container for storing the removable seat is opened to be oriented toward the rear row, a lid is installed at the opening for closing the opening, the lid is constituted as a pivotable lid capable of contacting with a floor within the automobile compartment, and when the lid contacts the floor, the guide structure is constituted between the lid and the removable seat.

According to this preferable means, the lid provided at the inlet opening portion of the storage container is constituted as a part of the guide structure constituted at the storage container. Therefore, the removable seat can be reliably guided to move by the guide structure of the lid. In addition, the lid is configured as a pivotable lid, and in the case that the lid contacts the floor, the positional relationship is brought to be the state closer to the seat installing member, and therefore, it is possible to determine the distance between the storage container and the seat installing member to be longer accordingly.

Further, in each of the above means, it may be preferable that a width in the vehicle width direction of the removable seat when the removable seat is installed within the automobile compartment is a width through which a passenger can pass, and it is arranged and constructed such that the passenger can pass through the installing position in the case that the removable seat is detached from an installing position.

According to this preferable means, in the case that the removable seat was detached from the seat installing member, a space where the removable seat was installed can be adapted to so-to-speak walk though of the passenger.

First, the basic construction of the seat attaching and detaching mechanism is a construction including first and second engaging means provided at the seat installing member and a lower face side of the removable seat at positions proximate to both ends thereof opposed to each other in a direction of a flat plane, and the second engaging means can be released by operating a side of the first engaging means of the removable seat in a direction for releasing engagement when the removable seat is operated to be detached from the seat installing member.

In the above construction of the seat attaching and detaching mechanism, although the seat installing member is a member for immovably fixing the seat against the floor of the automobile, it is only necessary that the removable seat is immovable relative to the floor by the seat installing member. More specifically, the seat installing member may be fixed to the floor of the automobile or may be fixed to the other automobile seat adjacent thereto. Both ends opposed to each other in the direction of the flat plane include both left and right ends and both front and rear ends.

Incidentally, the above seat attaching detaching mechanism further preferably takes the following construction:

First, it may be preferable that the engaging means on the side of the seat installing member of the seat attaching and detaching mechanism is a receiving member for receiving a pin member on the side of the movable seat. Although the first and second engaging means in this preferable construction may not be limited to be lock mechanisms or engaging mechanisms, at least the engaging means on the side of the seat is necessary to be a received member, such as a striker for a lock mechanism or an engaging pin for an engaging mechanism, which is received by a receiving member on the side of the support base.

Next, it may be preferable that a direction for releasing engagement of the first engaging means and a direction for releasing engagement of the second engaging means of the seat attaching and detaching mechanism are set to be different from each other. For example, the engagement releasing direction of the first engaging means may be a direction in a flat plane and the engagement releasing direction of the second engaging means may be an upward and downward direction or vice versa, and in such a case, the flat plane and the upward and downward direction may be considered to include an oblique direction. That is, the engagement releasing directions of the first and second engaging means are not limited as long as the engaging directions are not parallel and two-step operations in at least two directions are necessary when the operation for attaching and detaching the removable seat to and from the seat installing member is performed.

In the case that the engagement releasing directions of the engaging means are set to be different, it may be particularly preferable that the direction for releasing engagement of the first engaging means of the seat attaching and detaching mechanism is an upward and downward direction, and the direction for releasing engagement of the second engaging means is a direction of a flat plane. In addition, it may be preferable that the first engaging means of the seat attaching and detaching mechanism is a lock mechanism that requires an independent releasing operation, and the second engaging means is an engaging mechanism due to corresponding shapes.

In addition, it may be preferable that the first engaging means of the seat attaching and detaching mechanism is arranged on a rear side in a vehicle front and rear direction, the second engaging means is arranged on a front side in the vehicle front and rear direction, respectively, and the second engaging means is released from engagement by lifting a rear side of the seat and moving the removable seat toward a front side in a state that the first engaging means is released from locking.

Further, it may be preferable that the seat attaching and detaching mechanism is further provided with third engaging means comprising an engaging pin and an engaging hole, and an inner peripheral face of the engaging hole is formed to have a shape capable of engaging and guiding the engaging pin when the removable seat is mounted. However, there is no particular limitation to the disposing position of this third engaging means.

First, according to the one aspect of the present invention, it is not necessary to install a guide means such as a rail on a path from the installing position of the removable seat to the storage position. Therefore, it is possible to eliminate obstacles on the path from the installing position of the removable seat to the storage position and the appearance may be improved.

Further, in the case that the removable seat is the auxiliary seat disposed at the side portion of the basic seat and the auxiliary seat is installed attachably and detachably to and from the seat installing member formed to be integrally movable with the basic seat, the construction of the auxiliary seat can be simplified in comparison with the case where the basic seat and the auxiliary seat are installed on the floor independently of each other.

Further, in the case that the storage container is disposed between the left and right side seats, the arrangement position of the storage container may be set to a position that does not prevent a passenger from getting on and off. In addition, in the case that the arrangement positions of the removable seat and the storage container are set to be the state having the same positional relationship as viewed in the vehicle width direction, the guide structures constituted at the seat installing member and the storage container may be constructed to be relatively simple structures in comparison with the case that their arrangement positions are different arrangement positions in the vehicle width direction.

Further, in the case that the lid provided at the inlet opening portion of the storage container is constituted as a part of the guide structure constituted at the storage container, the removable seat can be reliably guided to move by the guide structure of the lid. In addition, in the case that the lid is configured as a pivotable lid and the lid contacts the floor, the positional relationship is brought to be the state closer to the seat installing member, and therefore, it is possible to determine the distance between the storage container and the seat installing member to be longer accordingly.

Further, in the case that a width in the vehicle width direction of the removable seat when the removable seat is installed within the automobile compartment is a width through which a passenger can pass, and in the case that the removable seat is detached from the seat installing member, a space where the removable seat was installed can be adapted to so-to-speak walk though of the passenger.

Further, according to the above seat attaching and detaching mechanism, the first and second engaging means are provided at positions proximate to both ends thereof opposed to each other in a direction of a flat plane, and the second engaging means can be released by operating a side of the first engaging means of the removable seat in a direction for releasing engagement when the removable seat is operated to be detached from the seat installing member. Therefore, because the second engaging means can be released by only the movement accompanied with the detaching operation of the removable seat, it is at least not necessary to incorporate a lock mechanism into the second engaging means, and it is possible to simplify the construction of the second engaging means while the operation is simple. In addition, in other words, the second engaging means cannot be released unless the side of the first engaging means is operated in the releasing direction, and therefore, the removable seat may not be accidentally detached from the seat installing member, and it is possible to reliably fix by the two engaging means.

Further in the case that the engaging means of the side of the seat in the seat attaching and detaching mechanism is a pin member, it is possible to substantially reduce the weight of the seat in comparison with the case that the receiving member (in particular, a lock mechanism) is provided on the side of the seat, and therefore, its attaching and detaching operations can be easily preformed. In addition, even in the case that a lock mechanism is incorporated as the engaging means, an operation lever for the releasing operation can be positioned close to the lock mechanism because the lock mechanism is provided on the side of the seat installing member, and therefore, a structure of a coupling construction or the like can be simplified.

Further, in the case that a direction for releasing engagement of the first engaging means and a direction for releasing engagement of the second engaging means of the seat attaching and detaching mechanism are set to be different from each other, disengagement of both of the first and second engaging means may not occur when a load is applied to the removable seat from one direction, and therefore, it is possible to effectively prevent the removable seat from being accidentally detached.

In the case that the direction for releasing engagement of the first engaging means of the seat attaching and detaching mechanism is set to be an upward and downward direction, the first engaging means, which is first released when the operation for detaching the removable seat from the seat installing member is performed, is always biased in the engaging direction by the own weight of the removable seat, and therefore, accidental releasing of engagement is prevented. In addition, by setting the direction for releasing engagement of the second engaging means to be a direction of a flat plane, by way of two steps due to difference from the engagement releasing direction of the first engaging means, it is possible to prevent the removable seat from being accidentally removed, and additionally, the lifting operation for operating to detach the removable seat from the seat installing member is necessary only on the side of the first engaging means, and therefore, it is possible to easily operate to detach the removable seat by a small force.

Further, in the case the first engaging means of the seat attaching and detaching mechanism is a lock mechanism, it is possible to reliably fix the seat to the support base. On the other hand, in the case that the second engaging means is simply an engaging mechanism, it is possible to simplify the construction. That is, accidental detachment is reliably prevented and the attaching and detaching operations can be easily performed while incorporating a simple construction that is the minimum necessary.

Further, according to the above seat attaching and detaching mechanism, the second engaging means can be released from engagement by lifting a rear side of the seat and moving the removable seat toward a front side in a state that the first engaging means is released from locking. With this construction, the attaching and detaching operations of the removable seat can be easily performed while seated on the other seat adjacent to the removable seat. In addition, in the case that a storage space for storing the removable seat is ensured on the front side of the automobile with respect to the seat installing member, the removable seat detached from the seat installing member can be smoothly stored within the front side storage space in conjunction with its detaching operation.

Further, in the case that the seat attaching and detaching mechanism is further provided with the third engaging means having shapes capable of engaging and guiding, positioning is possible when the removable seat is mounted to the seat installing member, and therefore, the removable seat can be further easily and reliably mounted.

DETAILED DESCRIPTION OF THE INVENTION

An embodiment of the present invention will be explained in reference to the drawings as follows.

Figure 12:
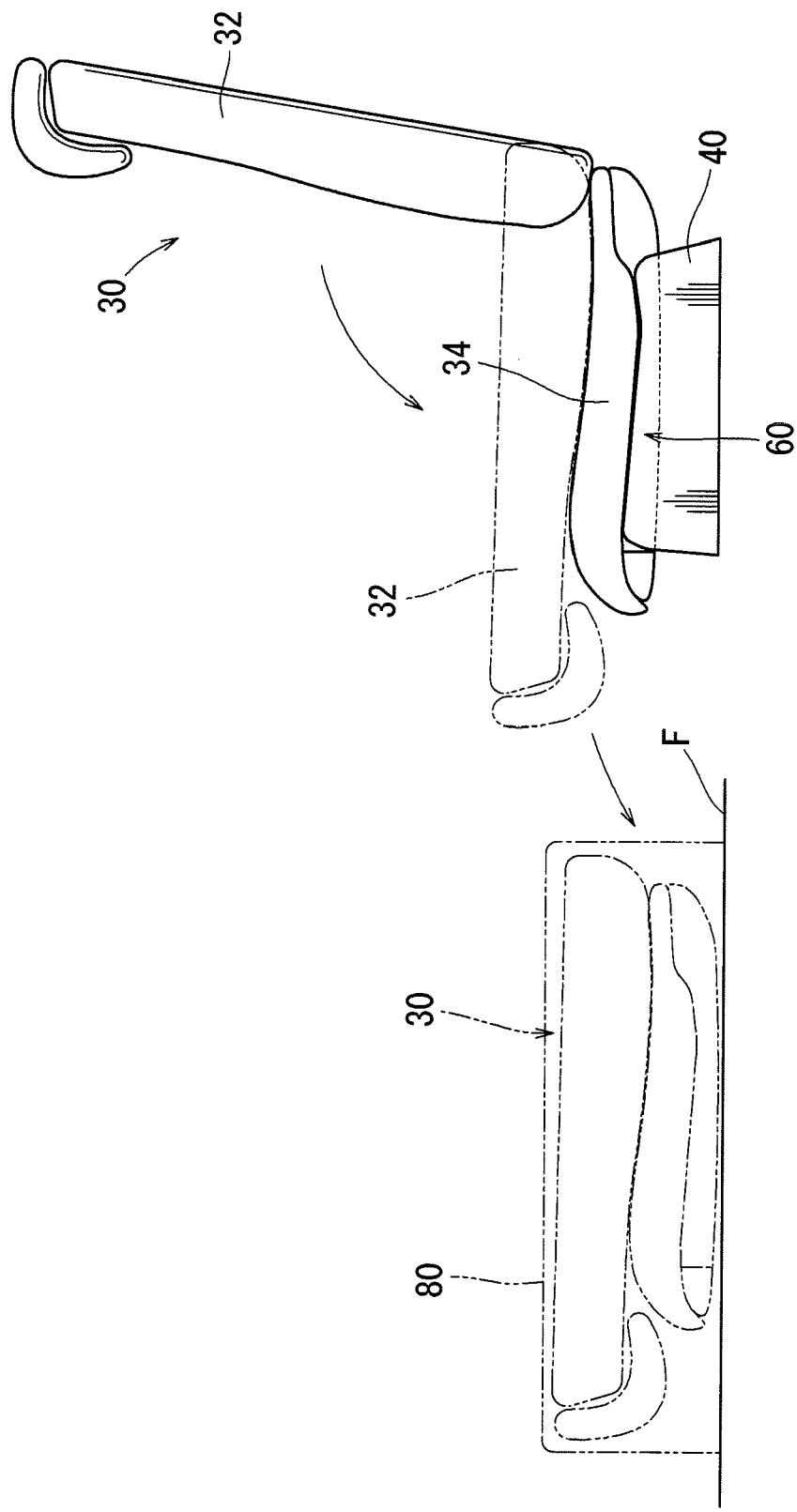
FIG. 12 is a schematic view showing movement during storing of the central seat in a side view.
Figure 16:
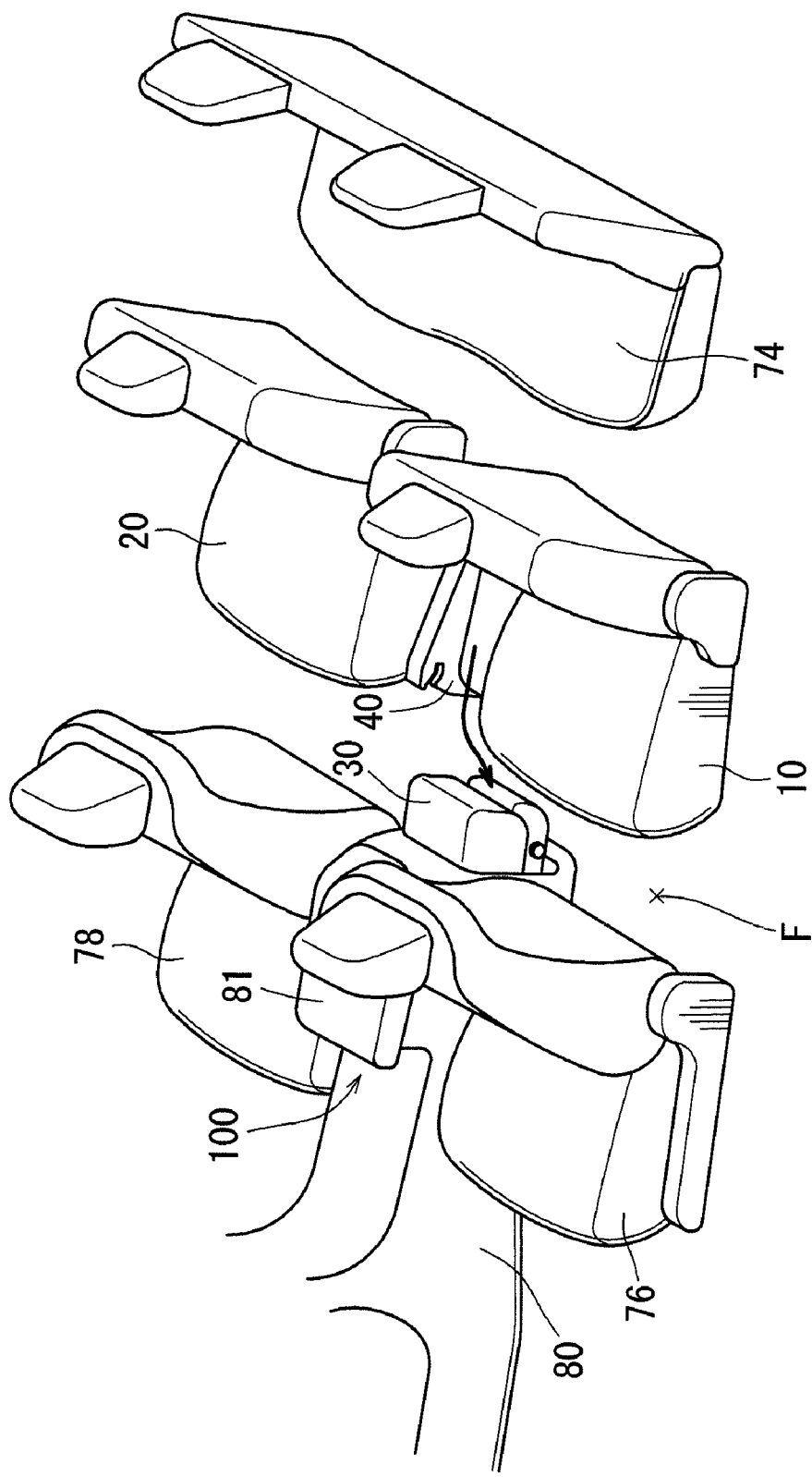
FIG. 16 is a perspective view showing an arranged state of the seats.

An embodiment is of a seat arrangement constitution, in which, three rows of seats are arranged in forward and rearward direction on a floor F within a compartment of an automobile of a so-to-speak one box type (see FIG. 16). Further, a central seat 30 at a central position of seats arranged in the second row is configured as a removable seat, and it is constructed to store the central seat 30 of the second row, which is removable, within a storage container 80 provided between left and right side seats 76, 78 of the a first row. Therefore, according to this embodiment, it is configured to store the central seat 30 of the second row within the storage container 80 provided on the floor F at a position of the first row. FIG. 12 shows the state, in which the central seat 30 of the second row is removed and is moved to be stored within the storage container 80 disposed between the seats of the first row. Further, in FIG. 16, numeral 74 designates a seat of a third row, which is formed as a so-to-speak integral bench seat.

Figure 1:
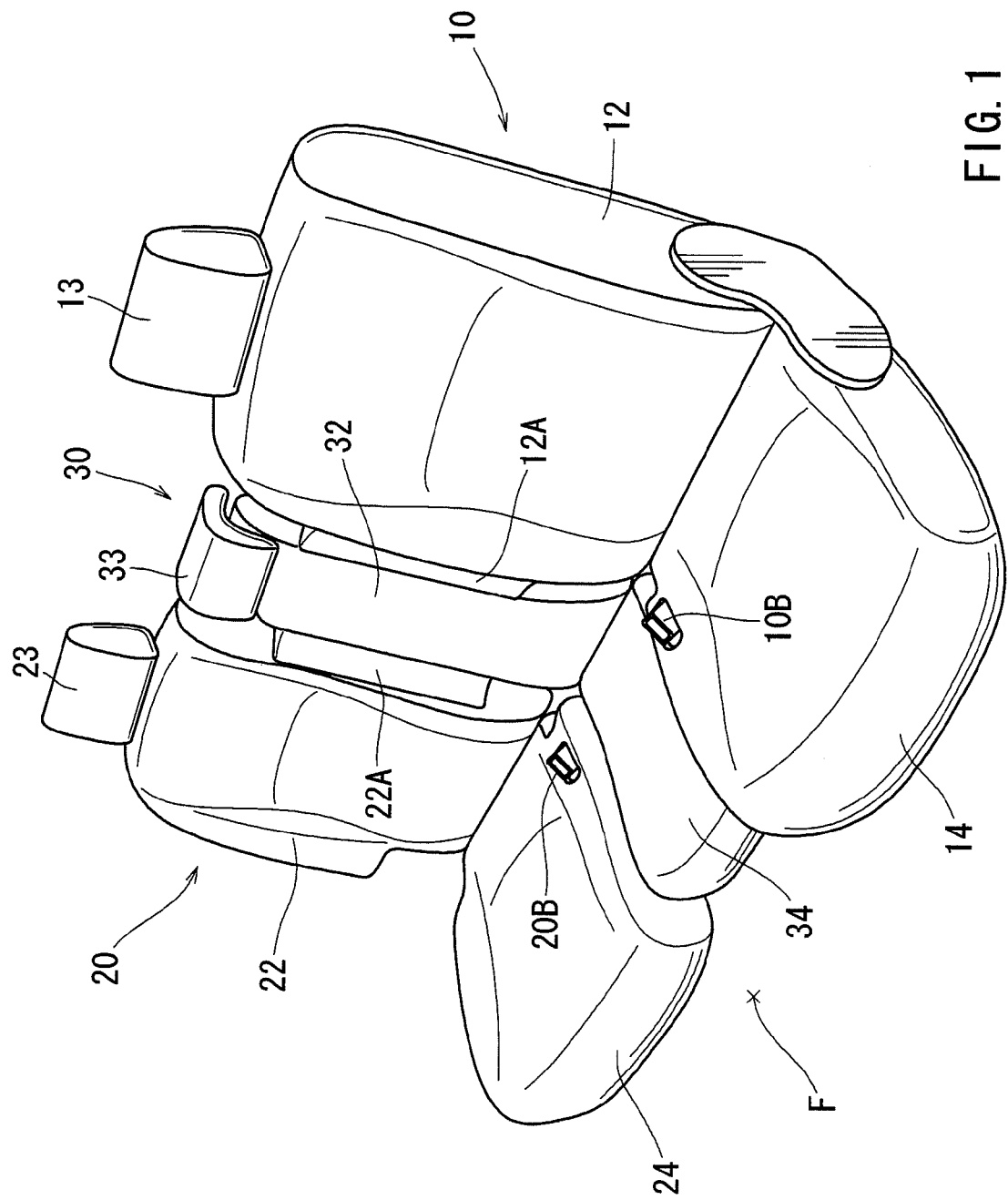
FIG. 1 is an external appearance in perspective view showing seats of a second row of the embodiment.
Figure 2:
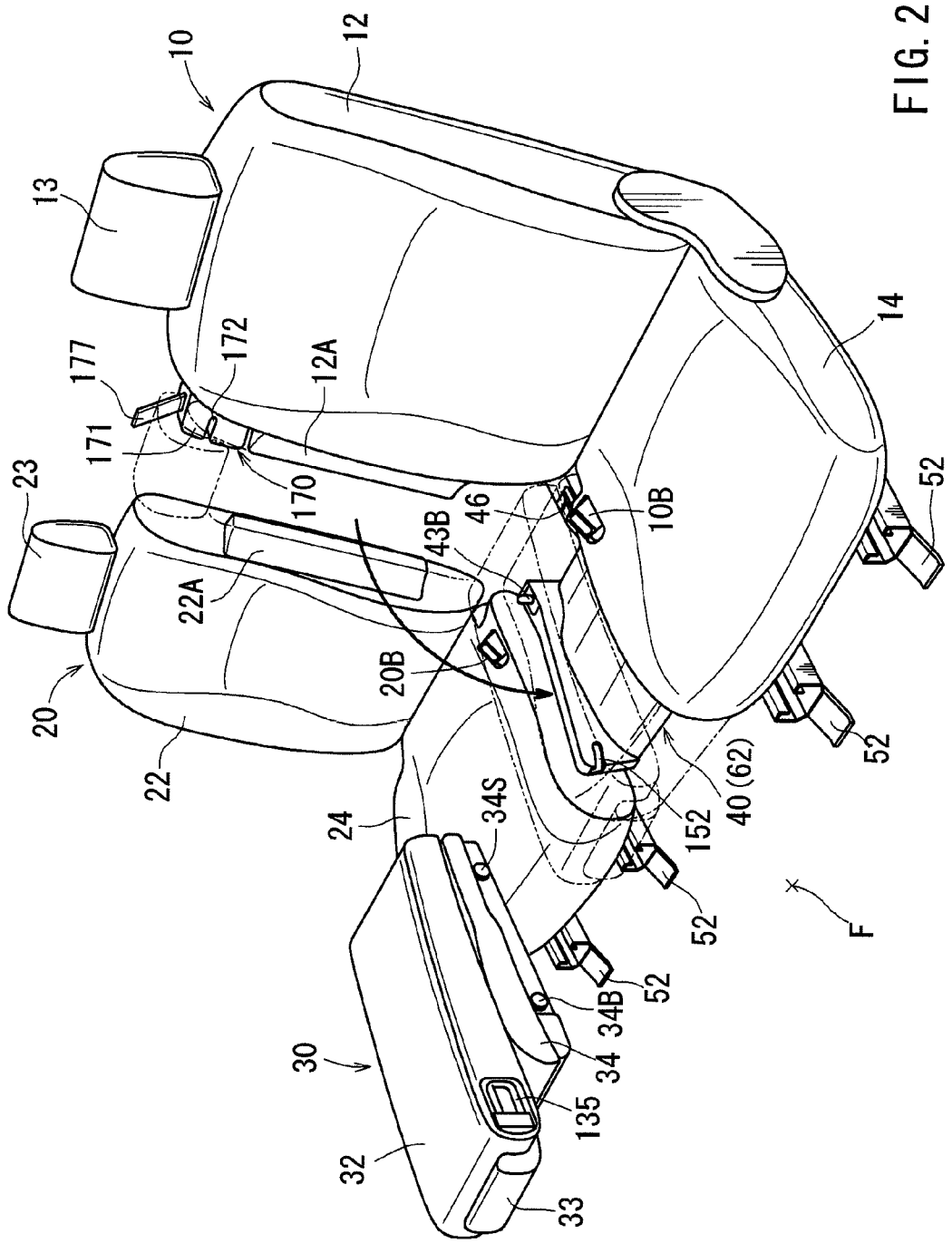
FIG. 2 is an external appearance in perspective view showing a state of removing a central seat from the seats of the second row.

First, a general explanation will be given to the entire structure of the seats of the second row incorporating the removable seat. FIG. 1 is an appearance perspective view showing the second row seats, and FIG. 2 is an appearance perspective view showing the state where the central seat 30 is removed. The second row seats are arranged on the floor F within the automobile compartment, and are constituted by both left and right side seats 10, 20, and the central seat 30 disposed therebetween. In the following explanation, in some cases, an explanation will be given by referring the side seat 10 disposed on the left side of the vehicle as the left side seat 10 and referring the side seat 20 arranged on the right side of the vehicle as the right side seat 20 for convenience of explanation. The left side seat 10 is shown on a right front side with respect to the paper face of FIG. 1 and the right side seat 20 is shown on a left back side with respect to the paper face.

The basic structures of the two side seats 10, 20 individually include seat backs 12, 22 and seat cushions 14, 24, as is well known. Similarly, the central seat 30 also includes a seat back 32 and a seat cushion 34. Further, in the drawing, reference symbols 12A, 22A designate arm rests, which are pivotally attached to the left and right side seats by a well-known method.

The central seat 30 serves as an auxiliary seat between the two side seats 10, 20. Therefore, horizontal widths of the seat back 32 and the seat cushion 34 of the central seat 30 are set to be about half of those of the seat backs 12, 22 and the seat cushions 14, 24 of the two side seats 10, 20. As shown in FIG. 2, the central seat 30 is disposed at a space S between the side seats 10, 20 and can be stored by being removed from a support base 40 in a shape of a saucer provided within the space S when the central seat 30 is not used. Although FIG. 2 shows a state of removing the central seat 30, and in the illustrated state, the central seat 30 is shown as being in a lifted state, it is configured such that, when the central seat 30 is actually slid to move for storing, it is not necessary to lift the central seat 30 as in the illustrated state, but the central seat 30 may be moved as it slides on an upper face of the support base 40.

Figure 11:
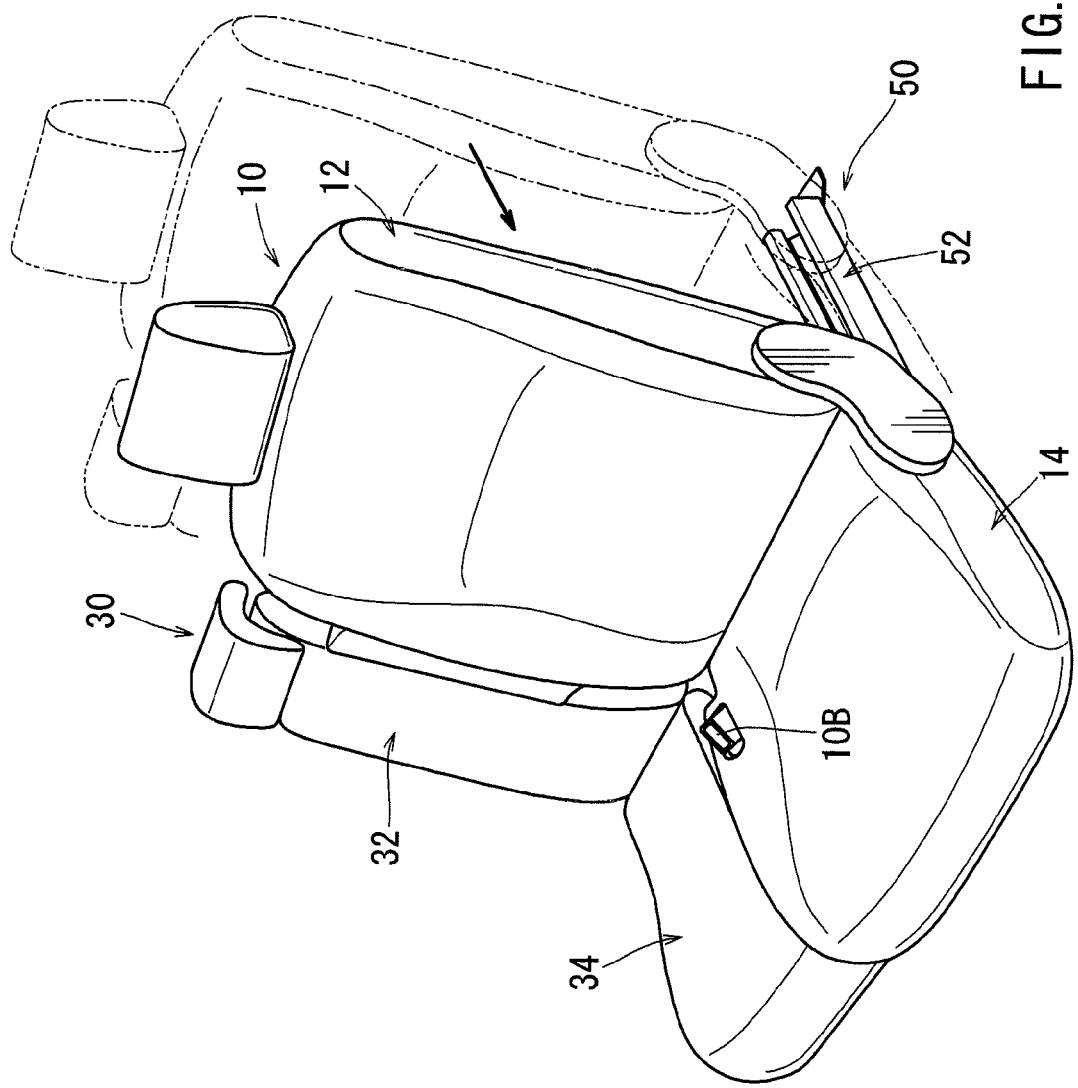
FIG. 11 is a perspective view showing a state of sliding to move the left side seat to a front side.

The support base 40 in the shape of the saucer supporting the central seat 30 is configured to extend in a protruding manner in a width direction from the left side seat 10 and is configured integrally with the left side seat 10. Here, the sliding positions of the side seats 10, 20 in forward and rearward directions of the vehicle can be adjusted by slide rails 50 provided between the side seats 10, 20 and the floor F. Therefore, as shown in FIG. 11, in a state where the central seat 30 is mounted on the support base 40, in accordance with a sliding movement of the left side seat 10 in the forward and rearward directions, the central seat 30 moves in the forward and rearward directions together therewith.

Referring back to FIG. 2, the space S between the side seats 10, 20 mentioned above is set to a width (for example, 400 mm) permitting a person to pass therethrough (walk through) in the forward and rearward directions of the vehicle. Therefore, in a state where the central seat 30 is removed from the support base 40, the provided space S can be used as a space for passing through by a person, or can be used as a space allowing a passenger seated on the third row seat 74 (see FIG. 16) to stretch out the legs. Further, in this case, the support base 40 can function as a stool when a person passes through or function as a footrest when the legs are stretched out.

Next, an explanation will be given to a structure related to the left side seat 10 and the central seat 30 constituted to be able to move together.

First, as shown in FIG. 2, the left side seat 10 includes the seat back 12 constituting a back rest portion and the seat cushion 14 constituting a seating portion. Here, a buckle 10B for mounting a seat belt is provided at a portion of the seat cushion 14 in the vicinity of an edge side proximate to the central seat 30 in a state of being exposed from a seating face. The buckle 10B is fixed to a skeleton portion of the seat cushion 14 by embedding its base side portion into inside of the seat cushion 14.

Figure 8:
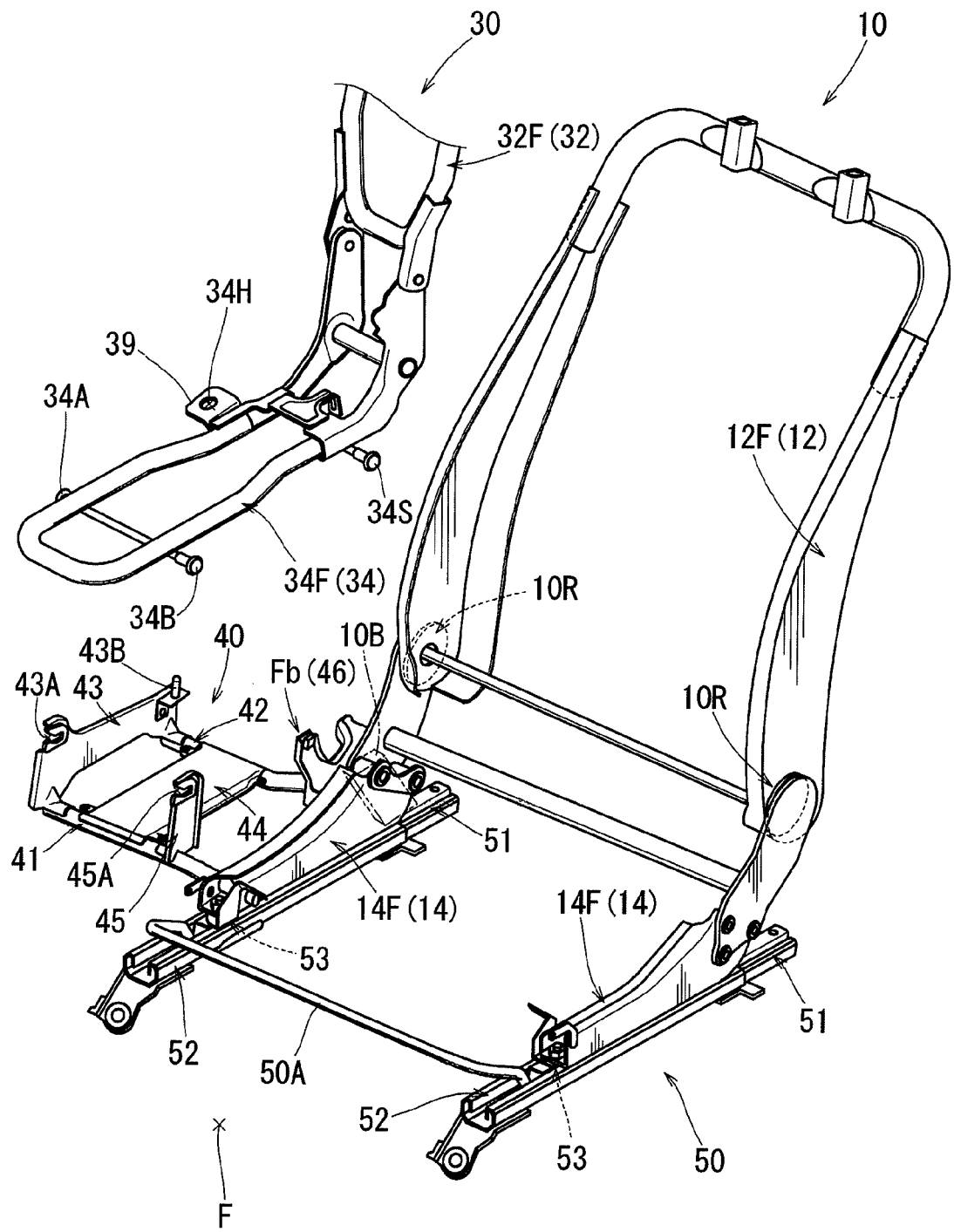
FIG. 8 is a perspective view showing skeleton structures of a left side seat and the central seat.

FIG. 8 shows a skeleton structure of the entire left side seat 10 in a perspective view. As shown in this figure, the skeleton portion of the left side seat 10 is constituted by a back frame 12F in a shape of a gate constituting a skeleton portion of the seat back 12, and cushion flames 14F constituting skeletons of the seat cushion 14 connected to both leg portions of the back frame 12F. Connection between the back frame 12F and the cushion flames 14F is made by reclining apparatus 10R respectively provided at positions between both leg portions of the back flame 12F and the cushion frames 14F. Incidentally, the constitution of the reclining apparatus 10R is publicly known in the art, and therefore, a detailed explanation thereof will be omitted.

The above-described cushion frames 14F are arranged at both side portions in a width direction of the seat cushion 14, and formed in a manner elongated in the forward and rearward directions along the shapes of side portions of the seat cushions 14. In details, the cushion flame 14F is formed to have a shape of a closed cross section by folding a plate-like member made of a steel plate and elongated in forward and rearward directions into a square tubular configuration in cross section, and welding the folded open side ends to each other. Therefore, the cushion frame 14F has the construction that is strong against bending or twisting, and the seat cushion 14 is supported by the cushion frame 14F stably from the lower side.

Further, the slide rail 50 in the forward and rearward directions is arranged between the cushion frame 14F and the floor F of the vehicle. The slide rail 50 has a construction in which each of upper rails 51 provided integrally with a lower face of the cushion frame 14F is slidably fitted into each of lower rails 52 extending in forward and rearward directions of the floor F.

Figure 7:
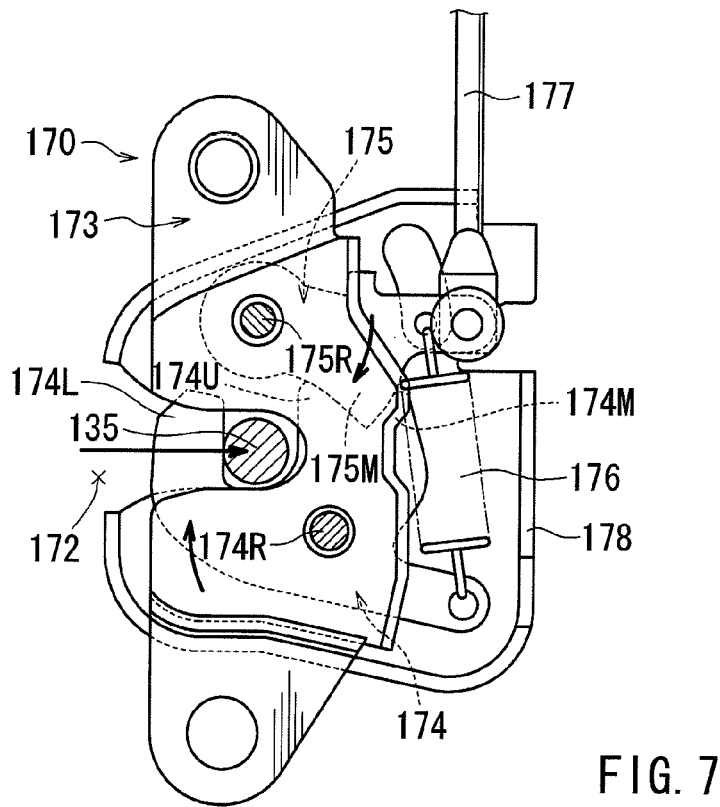
FIG. 7 is a structural view showing a lock state of the back lock apparatus.

Here, the upper rails 51 are normally held in a state of being locked with respect to a sliding movement relative to the lower rails 52 by slide lock apparatus 53 provided between the upper rails 51 and the lower rails 52. The lock state of the slide lock apparatus 53 is released by operating to lift an operation lever 50A disposed at a front position of the seat cushion 14 and connecting between the slide lock apparatus 53. Therefore, by releasing a locking state of the slide lock apparatus 53 by the operation of lifting the operation lever 50A, as shown in FIG. 7, the entire left side seat 10 can be slid in the forward and rearward directions relative to the floor F. Further, when the operation of lifting the operation lever 50A is stopped after sliding the left side seat 10, the slide lock apparatus 50 is returned again to the lock state. Therefore, the left side seat 10 can be locked at the adjusted slide position.

Further, the basic constitution of the right side seat 20 shown in FIG. 1 and FIG. 2 is also made to be substantially the same as the basic constitution of the left side seat 10 described above. That is, also the right side seat 20 includes the seat back 22 and the seat cushion 24, and a buckle 20B for mounting a seat belt is provided at a portion of the seat cushion 24 in the vicinity of the edge side proximate to the central seat 30 in a state exposed from a seating face. Further, also the right side seat 20 can be adjust with respect to a slide position in the vehicle forward and rearward directions by the slide rail 50 provided between the right side seat 20 and the floor F.

Figure 4:
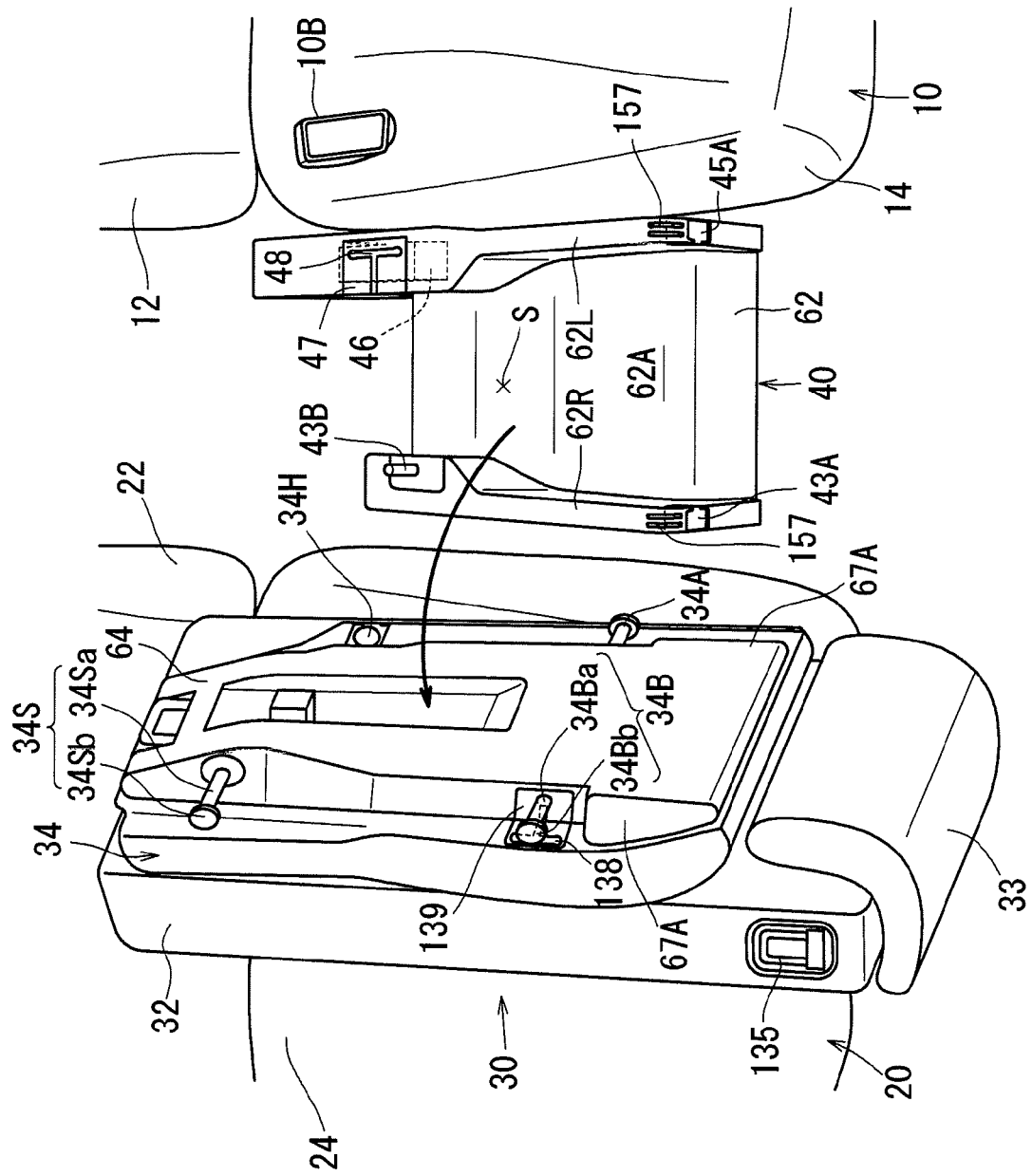
FIG. 4 is an enlarged view of a primary portion showing a structure for attaching and detaching the central seat to and from a support base.

Further, also the central seat 30 includes the seat back 32 and the seat cushion 34. The seat back 32 and the seat cushion 34 are formed to have horizontal widths that are narrower than those of the respective side seats 10, 20 as described above. As shown in FIG. 4, the central seat 30 is configured to be detachably mounted onto the support base 40 by engaging attaching and detaching structures disposed and formed on a lower face side of the seat cushion 34 with corresponding attaching and detaching structures formed and disposed at positions of both end portions in a width direction of the support base 40. The structure of attaching to and detaching the central seat 30 to and from the support base 40 will be explained later in details.

The seat back 34 of the central seat 30 is engaged to be locked against a lock apparatus, not illustrated, provided at the seat back 12 of the left side seat 10 by raising up a back rest angle toward the rear side in the mounted state of the seat cushion 34 onto the support base 40. Therefore, the back rest angle of the seat back 32 of the central seat 30 is maintained in such a way that that seat back 32 leans on the seat back 12 of the left side seat 10.

Figure 10:
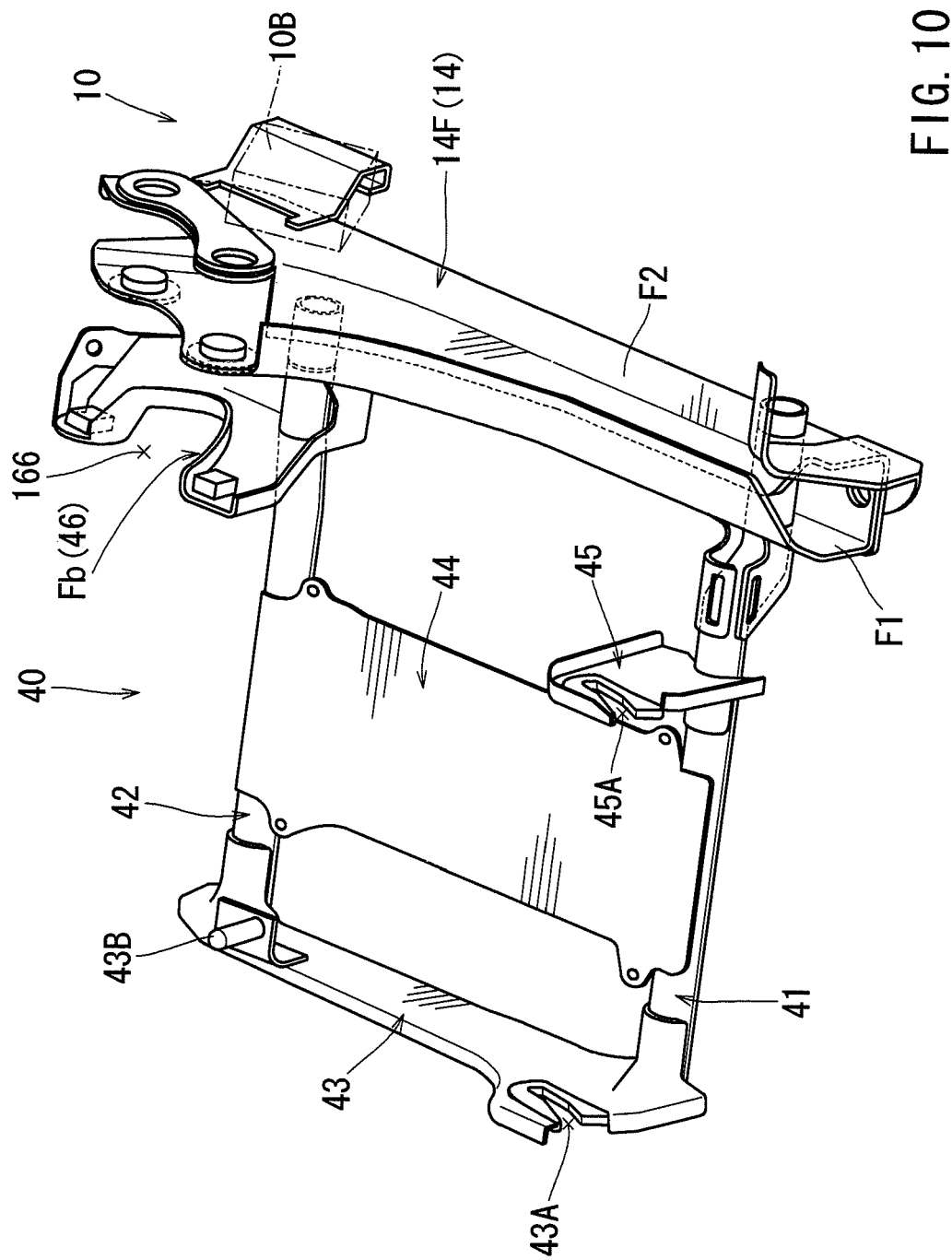
FIG. 10 is an enlarged view of a primary portion of FIG. 8 and showing an assembling structure of the support base.

Next, the details of a structure of integrating the support base 40 with the left side seat 10 will be explained. FIG. 10 shows in an enlarged scale the structure of integrating the support base 40 with the left side seat 10 by a perspective view. As shown in this figure, the support base 40 is constructed by rigidly coupling two pipe-like support frames 41, 42 made of metal and constituting a skeleton to the cushion frame 14F on a side proximate to the central seat 30 of the left side seat 10.

In details, the two support frames 41, 42 are arranged in forward and rearward directions to constitute a front side frame portion and a rear side frame portion of the support base 40, respectively. Further, an end portion on the right side of the paper face of the support frame 41 arranged on the front side penetrates into a first side plate portion F1 and a second side plate portion F2 constituting both side plate portions of the cushion frame 14F having a square tube-like cross section in a plate thickness direction so as to be inserted thereinto and rigidly coupled thereto.

On the other hand, the support frame 42 on the rear side is rigidly coupled to the first side plate portion F1 and a support bracket Fb formed of a steel plate arranged on a left side of the first side plate portion F1 as viewed in the figure. That is, on the second side plate portion F2, a base side portion of the above-described buckle 10B is provided in a state of being fixed to the cushion flame 14F, and the support frame 42 is constructed to be difficult in rigidly coupling thereto. With the support bracket Fb, the first side plate portion F1 and the second side plate portion F2 are arranged in the width direction such that their plate faces are opposed to each other. The support bracket Fb is provided as a functional part for fixing a cushion lock apparatus 46, which is provided for attachably and detachably engaging to lock the central seat 30 against the support base 40 explained later, to the cushion frame 14F.

Further, the above-described support flames 41, 42 are rigidly coupled integrally to a reinforcement flame 43 in a shape of an elongated plate made of metal and extending between end portions of the frames 41, 42 on the left side of the paper face. The reinforcement frame 43 is rigidly coupled to the support frames 41, 42 in such an orientation that the plate is positioned upright while being turned sideways. Further, the support frames 41, 42 are rigidly coupled integrally also to a reinforcement plate 44 in a shape of an elongated plate made of metal and extending therebetween at center positions thereof in the width direction. The reinforcement plate 44 is formed to be thinner than the reinforcement frame 43 in a plate thickness and larger than the reinforcement frame 43 in a plate width, and is rigidly coupled to the support flames 41, 42 in such an orientation that the plate is laid sideways. With this, the support frames 41, 42 are constructed to be improved in support rigidity including torsional rigidity or the like and support strength by the reinforcement frame 43 and the reinforcement plate 44 extending therebetween in an arrangement of parallel crosses.

Further, as shown in FIG. 4, the entire upper surface side of the support base 40 constituting the above-described skeleton structure is covered by a surface cover 62 made of a resin, and the internal skeleton structure cannot be viewed from an outer side. The surface cover 62 made of resin is constructed to have a rigidity by which the surface cover 62 is not substantially deformed or cracked even if an external pressing force is applied in the case that the central seat 30 is installed on the support plate 40, or in the case that the surface cover 62 is used as a stool or a footrest, Further, the above-described support base 40 corresponds to "a seat installing member" capable of attachably and detachably installing the central seat 30 serving as the removable seat according to the present invention.

Next, an explanation will be given to a general structure of a mechanism of attaching and detaching the central seat 30 to and from the support base 40 constituting the seat installing member. Further, a detailed structure thereof will be described later.

Figure 9:
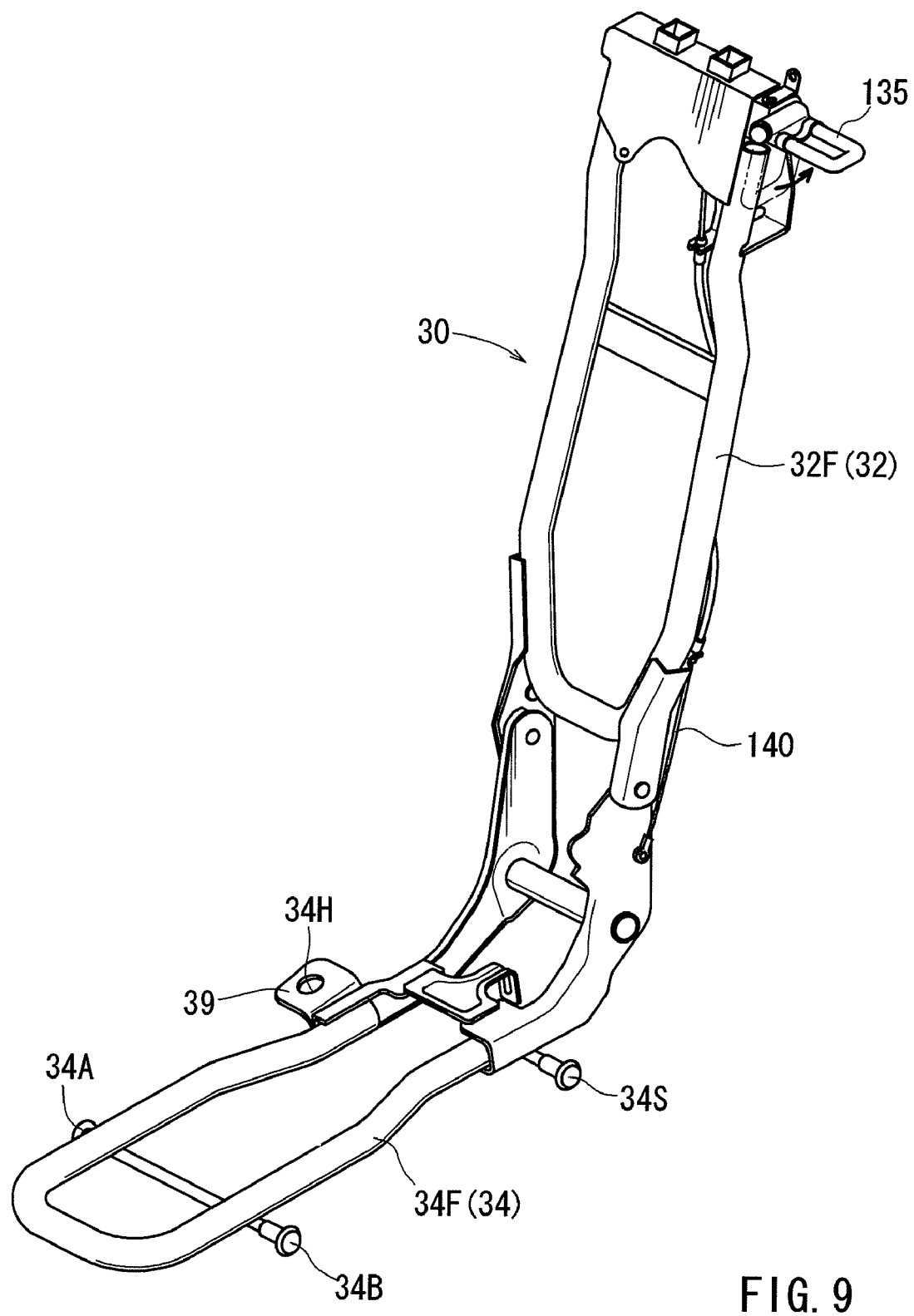
FIG. 9 is a perspective view showing an inner frame structure of the central seat.

As the detaching and detaching structure, as shown in FIG. 4, on a lower face side of the seat cushion 34 of the central seat 30, locking pins 34A, 34B, a positioning hole 34H and a striker 34 serving as the structure for attaching to and detaching from the support base 40. As shown in FIG. 8, the locking pins 34A, 34B are constituted by shapes of respective end portions of pin members that are provided at positions on a front side of a lower portion of a cushion frame 34F constituting a skeleton of the seat cushion 34 and extend in a width direction. Further, the positioning hole 34H is formed to penetrate a bracket 39 in a shape of a plate provided in a state of extending in the width direction at a position on a rear side of the lower portion of the cushion frame 34F. Further, the striker 34S is provided to extend in the width direction on a side opposite to the bracket 39 in the shape of the plate through which the positioning hole 34H extends at a position on the rear side of the lower portion of the cushion frame 34F. The pin members 34A, 34B, the bracket 39 and the striker 34S in the shapes of the plates are respectively fixed integrally to the cushion frame 34F. Further, in FIG. 8, for reason of a paper face, only a lower half portion of the back frame 34F constituting the skeleton of the seat back 32 of the central seat 30 is shown. Further, FIG. 9 shows a view showing the entire the back frame 32F.

Referring back to FIG. 4, on an upper face side of the support base 40, locking recess portions 43A, 45A, a positioning pin 43B and a cushion lock apparatus 46 are provided as the attaching and detaching structures in correspondence with the respective attaching and detaching structures provided at the central seat 30 mentioned above. As shown in FIG. 8, the locking recess portion 43A on one side is disposed at a position of a front end portion of the reinforcement frame 43 and is arranged and constructed to direct an opening portion in a recess shape thereof toward a front side. Further, the locking recess portion 45A on the other side is disposed at a position of an upper end portion of an uprise plate 45 integrally fixed to the cushion frame 14F of the left side seat 10, and is arranged and constructed to direct an opening portion in a recess shape thereof toward a front side. The uprise plate 45 is constructed to extend from the cushion frame 14F of the left side seat 10 to a position on an upper side of the support frame 40 on the front side. Further, the positioning pin 43B is provided at a position of a rear end portion of the reinforcement frame 43 integrally therewith, and is disposed in a manner projecting from the reinforcement frame 43 toward an upper side. Further, the cushion lock apparatus 46 is integrally fixed to the support bracket Fb that is integrally fixed to the cushion frame 14F of the left side seat 10. The support bracket Fb is constructed for inserting the support frame 42 on the rear side mentioned above, and is arranged with the first side plate portion F1 and the second side plate portion F2 of the cushion frame 14F in the width direction in such a manner that their plate faces are opposed to each other.

Referring back to FIG. 4, the surface cover 62 made of resin and provided in the form of covering the entire upper face side of the support base 40 is formed with a shape of including a seat plate portion 62A in a shape of a flat plate and a right side wall portion 62R (left side as viewed toward the paper face) and a left side wall portion 62L (right side as viewed toward the paper face) formed in a raised state at opposite end portions in the width direction.

The right side wall portion 62R formed on the left side as viewed toward the paper face is formed in such a manner that it covers to conceal the reinforcement frame 43 mentioned above in FIG. 8. In details, the right side wall portion 62R is formed to have a configuration with hollowed portions at positions where the locking recess portion 43A and the positioning pin 43B constituting components of the attaching and detaching structures are disposed. Therefore, although the surrounding of the locking recess portion 43A is covered by the right side wall portion 62R, the lock recess portion 43A is constructed to present a state of being exposed to outside and is embedded into inside of the surface cover 62 in its external appearance. In details, the hollowed opening shape of the right side wall portion 62R has a configuration hollowed such that the opening portion in the recess shape of the locking recess portion 43A is exposed to the front side and the paper face right side.

Further, the left side wall portion 62L formed on the right side as viewed toward the paper face is formed in such a manner that it covers to conceal the erected plate 45 and the cushion lock apparatus 46 mentioned above in FIG. 8. In details, the left side wall portion 62L is formed to have a configuration with hollowed portions where the locking recess portion 45A and the cushion lock apparatus 46 constituting components of the attaching and detaching structures are disposed. Therefore, although surroundings of the locking recess portion 45A and the cushion lock apparatus 46 are covered by the left side wall portion 62L, the locking recess portion 45A and the cushion lock apparatus 46 are constructed to present a state of being exposed to outside and are embedded into inside of the surface cover 62 in their external appearances. In details, the hollowed opening shape of the left side wall portion 62L has a configuration hollowed to expose the opening portion in the recess shape of the locking recess portion 45A toward the front side and the paper face left side and to expose the cushion lock apparatus 46 toward the upper side and the paper face left side, respectively.

Here, at the hollowed opening portion where the cushion lock apparatus 46 of the left side wall portion 62L is disposed, a flexible surface-like rubber fin 47 formed with a cut 48 in a T-like shape is provided. Therefore, the cushion locking apparatus 46 is covered by the rubber fin 47 and cannot be viewed in its external appearance.

As described above, the attaching and detaching structures are disposed at the positions on both sides in the width direction of the support base 40, and it is possible to have a shape of a flat plate at a central position. Therefore, it is possible to construct the surface cover 62 constituting the support base 40 such that it is easy to walk therethrough.

Next, an explanation will be given to a structure of moving to store the central seat 30 detached from the support base 40.

In order to store the central seat 30, as shown in FIG. 12, the seat back 32 is tilted down toward the front side to overlap with the seat cushion 34, and additionally, the central seat 30 is detached from the support base 40 by releasing coupling of the seat cushion 34 to the support base 40 (cushion lock apparatus 46), and it is then stored to the storage container 80 on the front side. Although a detailed structure of the storage container 80 will be described later, the storage container 80 is arranged between the left and the right side seats 76, 78 of the first row (FIG. 16). It is constructed such that the central seat 30 at this occasion is properly guided from the support base 40 to the position of the storage container 80 by a combination of the structure of the back face of the central seat 30 and the structure of the surface cover of the support base 40. Hence, a constitution for guiding the central seat 30 will be explained below.

Figure 13:
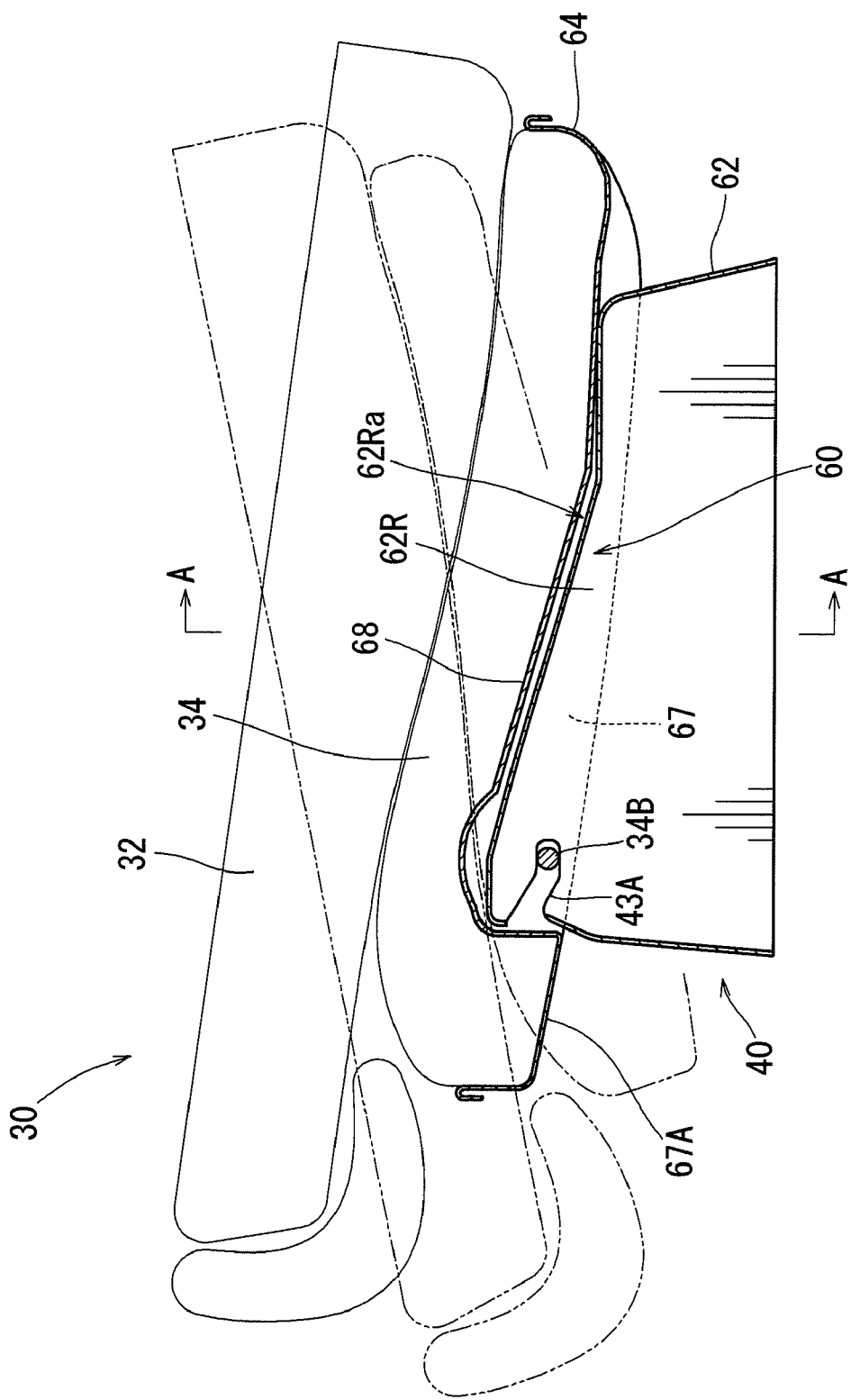
FIG. 13 is a sectional view showing a relationship between the central seat and the support base.
Figure 14:
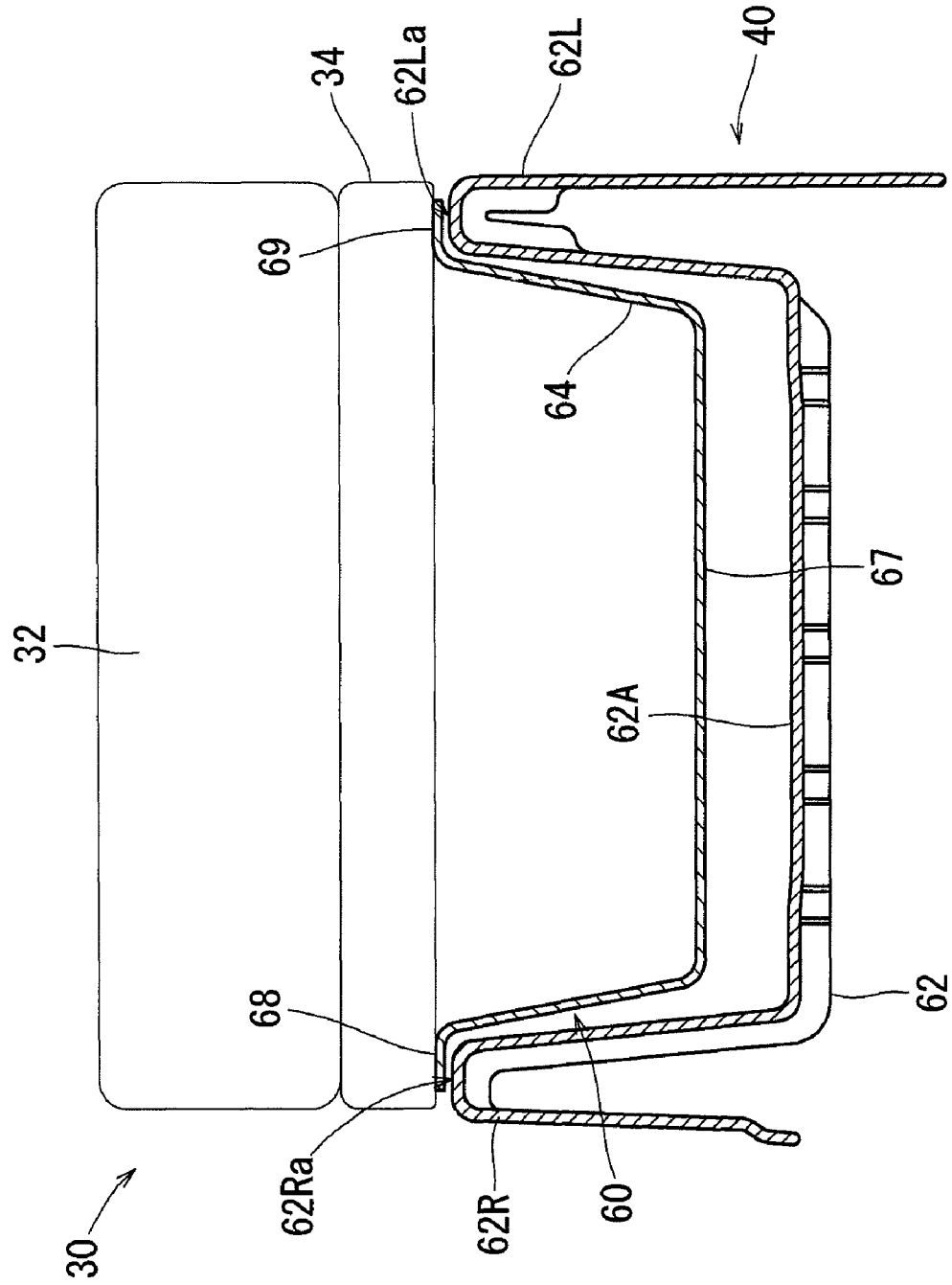
FIG. 14 is a sectional view taken in an A-A arrow direction in FIG. 13.

FIG. 13 is a sectional view showing the relationship between the central seat 30 and the support base 40. FIG. 14 is a sectional view in a direction of arrow A-A in FIG. 13. As is apparent also from these figures, in a state in which the central seat 30 is supported by the support base 40, the central seat 30 is positioned by fitting at a joint portion 60 constituted by a lower face of the seat cushion 34 of the central seat 30 and the surface of the support base 40. The joint portion 60 is constituted by the surface cover 62 made of resin and covering the surface of the support base 40 and an undercover 64 made of resin and covering a lower face of the seat cushion 34 (FIG. 4, FIG. 5).

Figure 15:
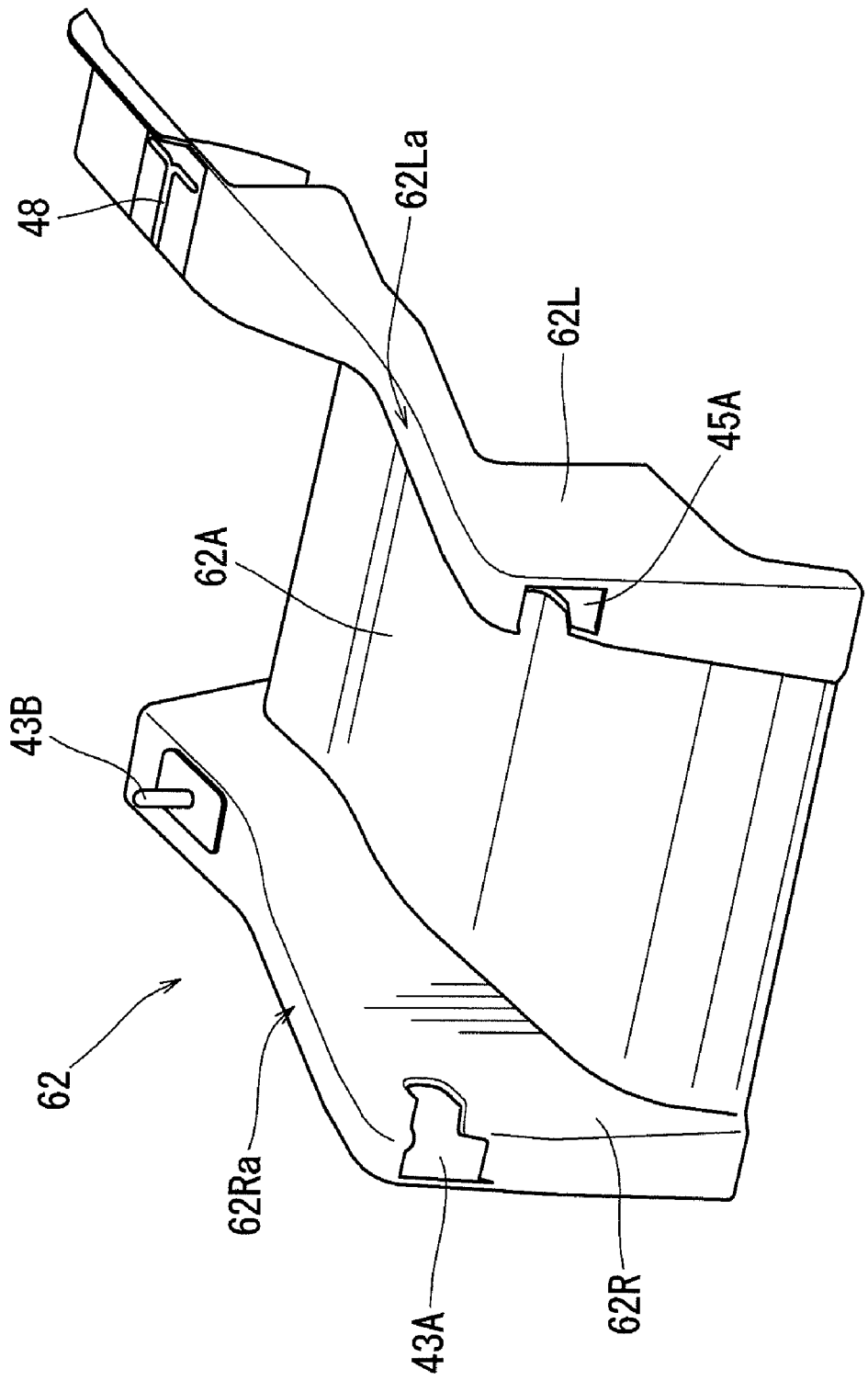
FIG. 15 is a perspective view showing only a surface cover of the support base.

With regard to the surface cover 62 of the support base 40 constituting the joint portion 60, as is apparent also from FIG. 15 showing a single one by a perspective view, both side walls including the right side wall portion 62R and the left side wall portion 62L raised upward are disposed respectively on both sides of a seat plate portion 62A in a shape of a flat plate of a center portion. Therefore, a sectional shape of the surface cover 62 is a recessed shape in which the center portion is lower than the both sides (FIG. 14). Further, upper edge portions of the both side wall portions 62R, 62L are respectively formed with guide faces 62Ra, 62La. The guide faces 62Ra, 62La are individually provided with predetermined widths, and are smoothly continued in the front and rear directions without largely changing individual heights thereof.

Front end portions of the both side wall portions 62R, 62L of the surface cover 62 are respectively formed with the engaging recess portions 43A, 45A in a manner of being cut to the rear side from individual end faces thereof. Further, the positioning pin 43B projected in the upper direction is provided proximately to a rear end portion of the guide face 62Ra of the side wall portion 62R disposed on one side. Further, the cut 48 in the shape of a character "T" is opened proximately to a rear end portion of the guide face 62La of the side wall portion 62L disposed on other side. Further, at an inner side portion of the guide face 62La in correspondence with the cut 48, the cushion lock apparatus 46 shown in FIG. 4 is assembled with the support bracket Fb (FIG. 8, FIG. 10) constituting the skeleton of the support base 40. The two engaging recess portions 43A, 45A, the positioning pin 43B, the cut 48 and the cushion lock apparatus 46 are adapted to couple (lock) the seat cushion 34 of the central seat 30 to the support base 40.

Figure 5:
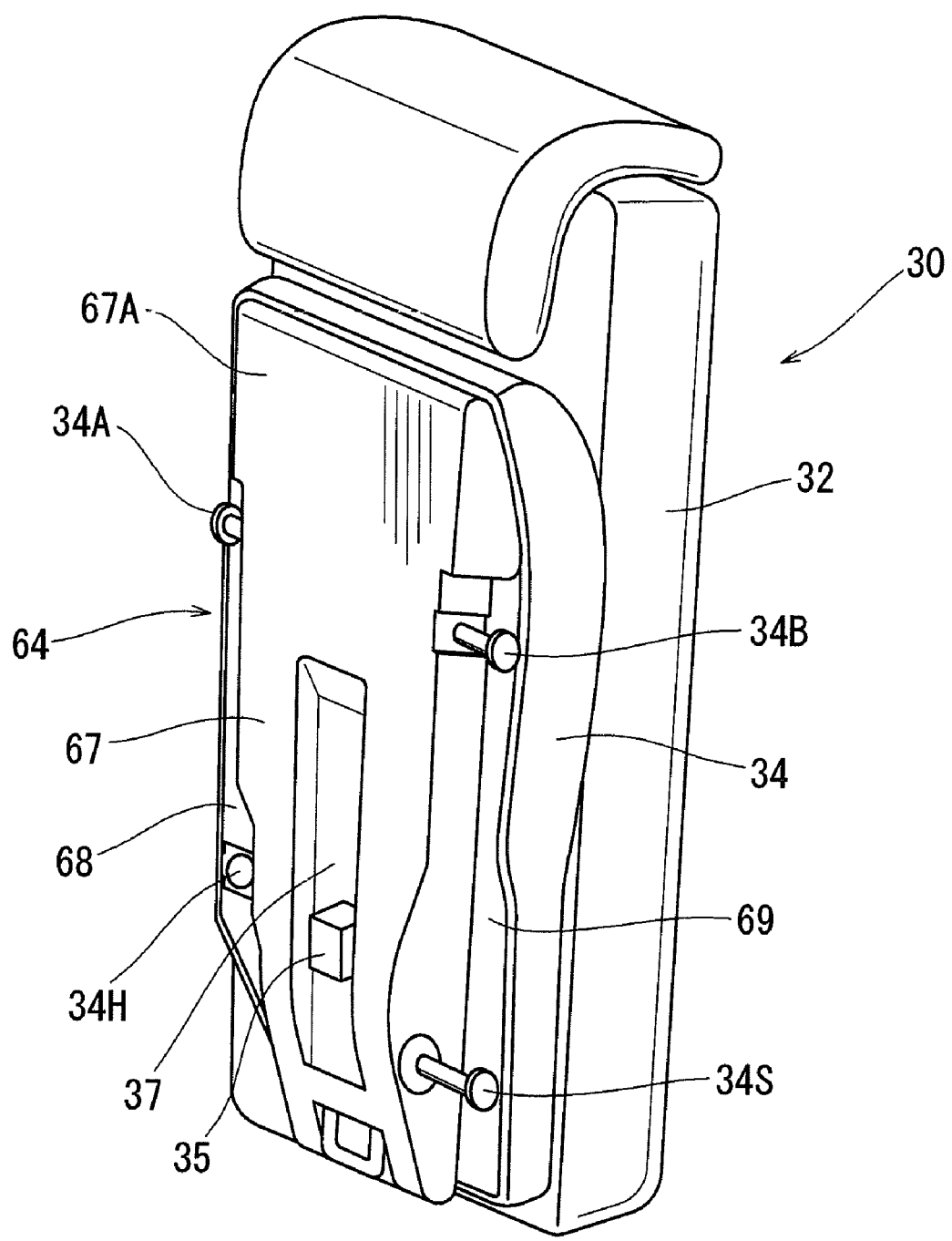
FIG. 5 is a perspective view showing the central seat taking out in a folded state and viewed from a lower face side thereof.

With regard to the undercover 64 of the seat cushion 34 constituting the joint portion 60, as is apparent also from FIG. 5 showing the central seat 30 by the enlarged perspective view, a bulged portion 67 continuous in the front and rear directions (upward and downward directions in FIG. 5) is provided at a center portion of a lower face of the seat cushion 34. Further, both sides of the bulged portion 67 constitute flange portions 68, 69 in shapes of steps deepened by one step, respectively, and also the flange portions 68, 69 are continuous in the front and rear directions. Further, a front end bulged portion 67A at a front end portion of the bulged portion 67 is formed to be wider in width than the bulged portion 67. Further, a center portion of a rear end portion of the bulged portion 67 is formed with a vertically elongated recess 37 and a projection 35 is formed at inside of the recess 37. The height of the projection 35 is set to be the same height as the height of the bulged portion 67.

As shown in FIGS. 13, 14, at the joint portion 60 in a state in which the central seat 30 is supported by the support base 40, the bulged portion 67 of the undercover 64 is positioned at a position of the seat plate portion 62A of the center portion of the surface cover 62, and the both flange portions 68, 69 of the undercover 64 are positioned on the guide faces 62Ra, 62La of the both side wall portions 62R, 62L of the surface cover 62.

As can be understood from the above explanation of the constitution, the structures of the joint portion 60 provided by the concave and convex fitting between the undercover 64 of the seat cushion 34 and the surface cover 62 of the support base 40 correspond to "guide structure constituted between the removable seat and the seat installing member" referred to in the present invention. Further, a convex structure of the bulged portion 67 of the undercover 64 is the guide structure constituted at the removable seat and a concave structure of the seat plate portion 62A of the surface cover 62 is the guide structure constituted at the seat installing member. Fitting structures of these guide structures are formed such that the central seat 30 is guided to move in a direction of installing the storage container 80 when the central seat 30 is released from being locked and is moved to slide, At a front side (upper side in FIG. 5) portion of the bulged portion 67 of the undercover 64, as described above, the engaging pins 34A, 34B projecting laterally from both side faces thereof are respectively provided. In contrast thereto, at a rear side (lower side in FIG. 5) portion of the bulged portion 67 of the undercover 64, a single piece of the striker 34S projecting laterally from one side face thereof is provided. Further, the positioning hole 34H is provided at the flange portion 68 disposed on one side at a portion of the undercover 64 proximate to the rear side. Further, with regard to the shape of each of the engaging pins 34A, 34B and the striker 34S, a front end of a shaft portion is formed with a flange portion in a circular shape, a diameter of which is enlarged in comparison with the shaft portion, and the flange portion is disposed slightly outward in the width direction from a lateral width position of the front end bulged portion 67A.

Here, a procedure of locking the seat cushion 34 of the central seat 30 to the support base 40 will simply be explained. First, the two engaging pins 34A, 34B of the seat cushion 34 are respectively engaged with the two engaging recess portions 43A, 45A of the surface cover 62 of the support base 40. In this state, the central seat 30 is tilted down toward the support base 40, while the two engaging pins 34A, 34B serving as fulcra, and the joint portion 60 of the seat cushion 34 and the support base 40 is brought to be fitted (FIG. 13, FIG. 14). At this occasion, the positioning pin 43B of the support base 40 is brought to the positioning hole 34H of the seat cushion 34, and the striker 34S of the seat cushion 34 moves from the cut 48 of the support base 60 to the back face of the surface cover 62 and is coupled to the cushion lock apparatus 46. With this, the seat cushion 34 of the central seat 30 is locked against the support base 40 in a state of being positioned. Further, in a state of using the central seat 30 shown in FIG. 1, the seat back 32 is locked by the seat back 12 of the left side seat 10 disposed on one side.

In order to store the central seat 30, first, the locking condition of the back lock apparatus between the seat back 32 and the seat back 12 of the side seat 10 is released, and the seat back 32 is tilted down forwardly to be overlapped with the seat cushion 34 as described already (FIGS. 12 through 14). Next, after releasing the cushion lock apparatus 46 on the side of the seat cushion 34, as indicated by imaginary lines in FIG. 13, the rear end portion of the central seat 30 is lifted, while the two engaging pins 34A, 34B of the seat cushion 34 serving as fulcra. Therefore, the positioning pin 43B of the support base 40 is removed from the positioning hole 34H of the seat cushion 34, and the striker 34S of the seat cushion 34 is removed from the cut 48 of the surface cover 62. When the central seat 30 is slightly moved forwardly relative to the support base 40 under the state, the two engaging pins 34A, 34B of the seat cushion 34 are separated from the two engaging recess portions 43A, 45A of the support base 40.

Then, the central seat 30 is moved to the front side and is stored in the storage container 80 while sliding the undercover 64 of the seat cushion 34 along the surface cover 62 of the support base 40 constituting the joint portion 60 (FIG. 12). At this occasion, the movement of the central seat 30 is guided on the condition that the bulged portion 67 of the undercover 64 is positioned at the position of the seat plate portion 62A of the center portion between the two side wall portions 62R, 62L of the surface cover 62 and that the two flange portions 68, 69 of the undercover 64 are supported and guided by the guide faces 62Ra, 62La of the two side wall portions 62R, 62L. Therefore, a locus of the movement of the central seat 30 toward the storage container 80 from the support base 40 is stabilized, and the situation of moving the central seat 30 to shift largely in left and right directions does not occur.

Further, a sliding movement of the central seat 30 from the support base 40 to the storage container 80 is performed on the condition that the fitting state of the joint portions 60 between the surface cover 62 of the support base 40 and the undercover 64 of the lower face of the seat cushion 34 is maintained and that the guide structure by the undercover 64 reaches the guide structure of the storage container 80.

In summarizing the above-described operation of detaching the central seat 30 from the support base 40 and sliding to move the central seat 30 to the storage container 80, by operating to lift the rear side of the folded central seat 30 in order to release the engagement of the striker 34S from the cushion lock apparatus 46, the locking pins 34A, 34B are brought into the condition that they can be released from the locking recess portions 43A, 45A toward the front side. That is, the central seat 30 is detached from the support base 40 by a two-stage attitude operation in which only the rear side is first operated toward the upper side and is thereafter operated toward the front side as it is. The detached central seat 30 thereafter slides to reach the storage container 80 without being entirely separated and lifted on the condition that the fitting state of the joint portion 60 is maintained. During the sliding movement, the central seat 30 can move without contacting with a carpet or the like of the floor F between the support base 40 and the storage container 80.

When the central seat 30 is used, the central seat 30 is taken out from the storage container 80, and the central seat 30 is moved to the rear side while the undercover 64 sliding along the surface cover 62 constituting the joint portion 60. Therefore, the two engaging pins 34A, 34B of the seat cushion 34 are respectively engaged with the two engaging recess portions 43A, 45A of the support base 40. Thereafter, as already explained, the positioning hole 34H of the seat cushion 34 and the positioning pin 43B of the support base 40 are engaged with each other, and the striker 34S of the seat cushion 34 is coupled to the cushion lock apparatus 46. Further, the seat back 32 of the central seat 30 and the seat back 12 of the side seat 10 are locked with each other.

In this way, by utilizing the joint portion 60 between the seat cushion 34 of the central seat 30 and the support base 40, the central seat 30 can smoothly be moved between the support base 40 supporting the central seat 30 at a position at which the central seat 30 can be used, and the storage container 80 provided adjacent thereto. Therefore, it is not necessary to provide special guiding means between the support base 40 and the storage container 80.

Next, a structure of storing the central seat 30 which has moved to be stored will be explained. In the following, three configurations of storing structures will be explained.

First, a first configuration of a storing structure shown in FIG. 16 through FIG. 21 will be explained. The central seat 30 detached from the support base 40 is stored within a console box 100 arranged between the left and right side seats 76, 78 of the first row as shown in FIG. 16. That is, the console box 100 is constituted by a storage container 81 of an upper portion for containing small articles or the like, and the storage container 80 on a lower side having an opening on a vehicle rear side, and the central seat 30 of the second row is intended to be stored within the storage container 80. Further, the console box 100 is disposed on the front side of the central seat 30, and the opening of the storage container 80 is formed on the rear side, and therefore, it is constructed such that the central seat 30 can be efficiently stored within a storage space on the front side directly after the operation of detaching the central seat 30 from the support base 40. That is, both of a position in a vehicle width direction of the storage container 80 arranged between the left and right side seats 76, 78 of the first row and a position in the vehicle width direction of the central seat 30 arranged between the left and right side seats 10, 20 of the second row are a center position in the vehicle width direction and have the same positional relationship.

In FIG. 17 through FIG. 21, the storage container 80 exhibits a shape of a longitudinally elongated hexahedron partitioned by a bottom wall 85, left and right side walls 86, 86 upright from left and right ends of the bottom wall 85 to the upper side, a top wall 87 extending between and on the left and right side walls 86, 86 and closing an upper face of the storage container 80, and a back wall 88 closing the backside of the storage container. Further, left sides in the figures of FIG. 18 through FIG. 21 correspond to a front side of the automobile and a backside of the storage container 80 of the embodiment, and right sides in the figures of FIG. 18 through FIG. 21 correspond to a rear side of the automobile and the opening side and the rear side of the storage container 80 of the embodiment. The storage container 80 is provided with a height dimension having a tolerance to such a degree that allows the central seat 30 to be operated to slightly change an attitude thereof with the storage space as described later while the storage container is formed with a shape enabling the central seat 30 of the second row to be just stored therein.

Figure 17:
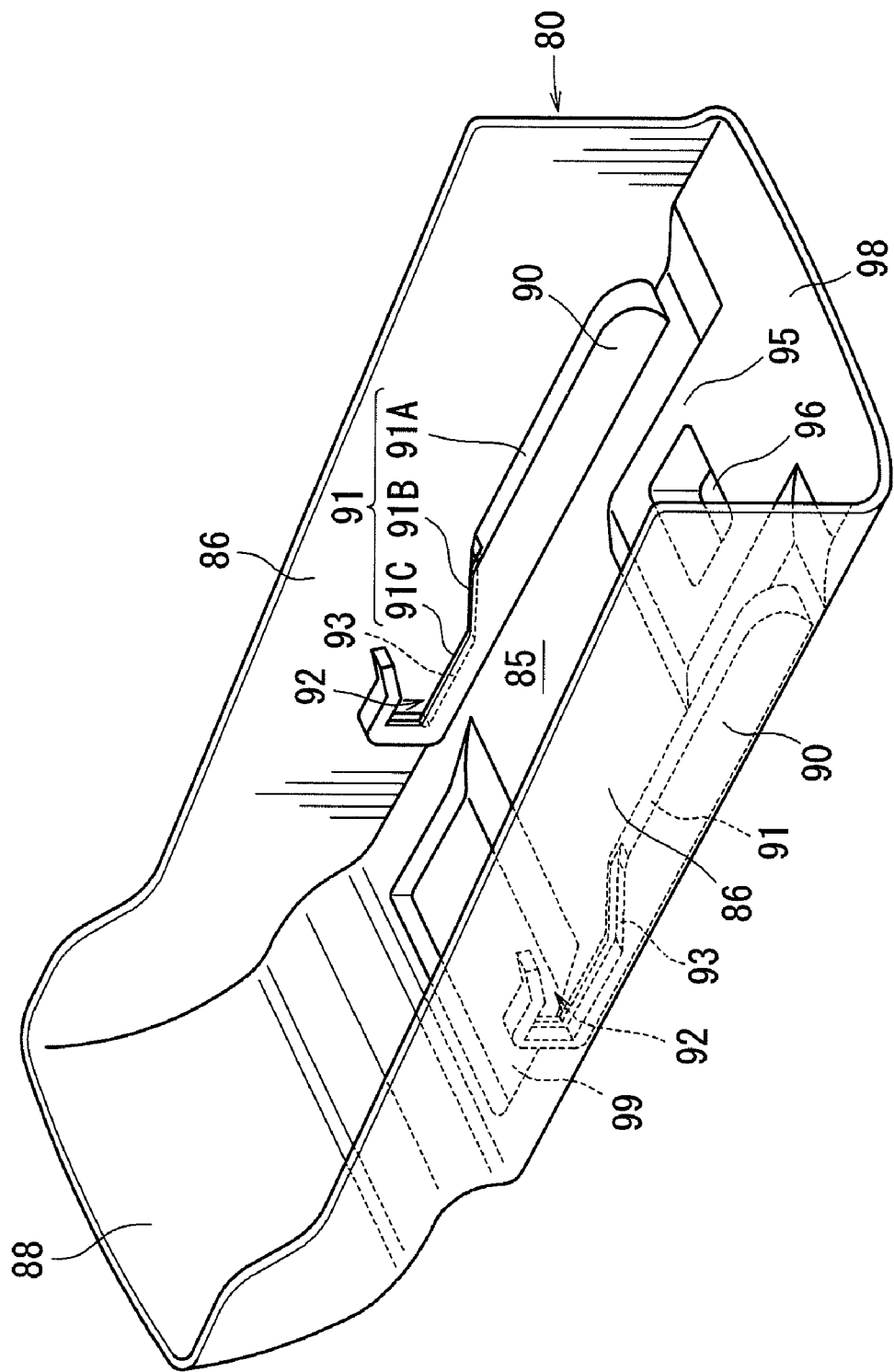
FIG. 17 is a perspective view showing a storage container of a first configuration of a storing structure.

Further, in FIG. 17, extending portions 90, 90 formed to extend toward an inner side in the width direction are formed on inner faces of the left and right side walls 86, 86, and an upper face of the extending portion 90 is configured to have shapes of a rail. More specifically, the extending portions 90 are formed in front and rear directions at lower ends of the left and right side walls 86, 86 along the side walls 86 and are formed in a shape of a hook laid sideways. Therefore, a rail 91 on the upper face is constituted by a horizontal portion 91A at a position of a predetermined height, an inclined portion 91B inclined to a lower side in continuation with a back side of the horizontal portion 91A, and a stepped horizontal portion 91C which continues with a back side of the inclined portion 91B and is lower than the horizontal portion 91A by one step. Further, at a back end of the rail 91 (stepped horizontal portion 91C), a fixing portion 92 having a back side and an upper side surrounded in a manner like a .-shape in section is provided. An extending dimension of the extending portion 90, that is, a width dimension of the rail 91 is in the order of slightly larger than the thickness of the striker 34S or flange portions of the locking pins 34A, 34B of the central seat 30, and a width dimension between the two left and right extending portions 90, 90 is set to be wider than the width dimension of the front end bulged portion 67A of the undercover 64 of the central seat 30. Therefore, it is arranged and constructed such that when the central seat 30 is slid to be inserted into the storage container 80, only the flange portions of the locking pins 34A, 34B of the central seat 30 are slid on the rails 91, and the bulged portion 67 and the front end bulged portion 67A of the undercover 64 are not brought into contact with the rail 91. Further, at ends of the inclined portions 91B and the stepped horizontal portions 91C of the rails 91 on the side of the side walls 86, grooves 93 having a width dimension capable of receiving the flange portions of the striker 34S and the locking pins 34A, 34B of the central seat 30 are formed.

The groove 93 extends to also the back face of the fixing portion 92 disposed on the back side of the rail 91. Here, the extending portion 90 is formed purposely for providing the rail 91 in order to ensure its strength for preventing the rail 91 from being damaged by the weight of the central seat 30 sliding on the rail 91.

At a center portion in the width direction on the rear side (opening side) of the bottom wall 85 of the storage container 80, a raised portion 95 is formed integrally with the bottom wall 85 in a raised manner toward an upper side, and a center portion of the raised portion 95 is formed with a fitting recess portion 96 recessed from the upper face of the raised portion 95 toward the lower side. A width dimension and a raising dimension of the raised portion 95 from the bottom wall 85 are set to be substantially the same as the width dimension of the recess 37 formed at the lower face of the central seat 30 and the recessed dimension from the lower face of the undercover 64. In details, the width dimension of the raised portion 95 is one size smaller than the width dimension of the recess 37, and the raising dimension of the raised portion 95 from the bottom wall 85 is slightly larger than the recessed dimension of the recess 37 from the lower face of the undercovers 67. Further, the fitting recess portion 96 is formed to have a size and a shape that enables to be fitted with the projection 35 of the lower face of the central seat 30.

Further, a rear edge portion 98 (opening side) of the bottom wall 85 of the storage container 80 is disposed at the same height as the raising dimension (height dimension) of the raised portion 95a, the bottom wall is lowered from the rear edge portion 98 toward the back side of the storage space and becomes horizontal at a center portion in front and rear directions of the bottom wall 85, and from this, a recess portion 99 which is further declined toward the back side of the storage space is formed in series.

Figure 18:
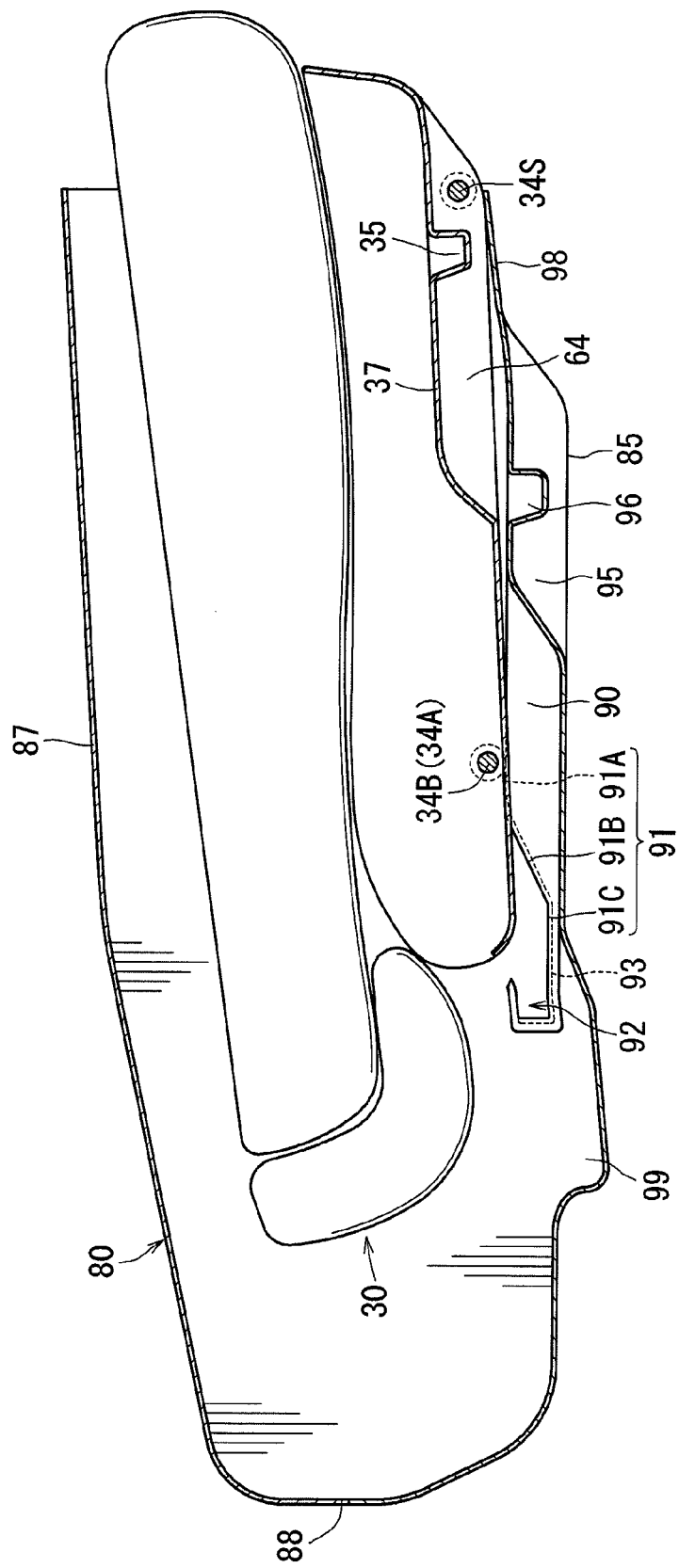
FIG. 18 is a sectional side view showing an initial state of storing the central seat into the storage container of the same configuration.

Next, a structure for storing and fixing the central seat 30 to the storage container 80 constructed as described above will be explained in reference to FIG. 17 through FIG. 21. When the central seat 30 is slid to be inserted into the storage space within the storage container 80 from the front side with the rear side of the central seat 30 supported by the hand, the lower face of the central seat 30 first moves toward the back side while it slidably contacts with the rear edge portion 98 of the storage container 80, and as shown in FIG. 18, the locking pins 34A, 34B disposed on the front side of the central seat 30 are brought into sliding contact with the rails 91. During the time when the locking pins 34A, 34B of the central seat 30 shown in FIG. 18 slide on the horizontal portions 91A of the rails 91, the central seat 30 is separated (floated up) from the other members than the rear edge portion 98 of the bottom wall 85 of the storage container 80.

Figure 19:
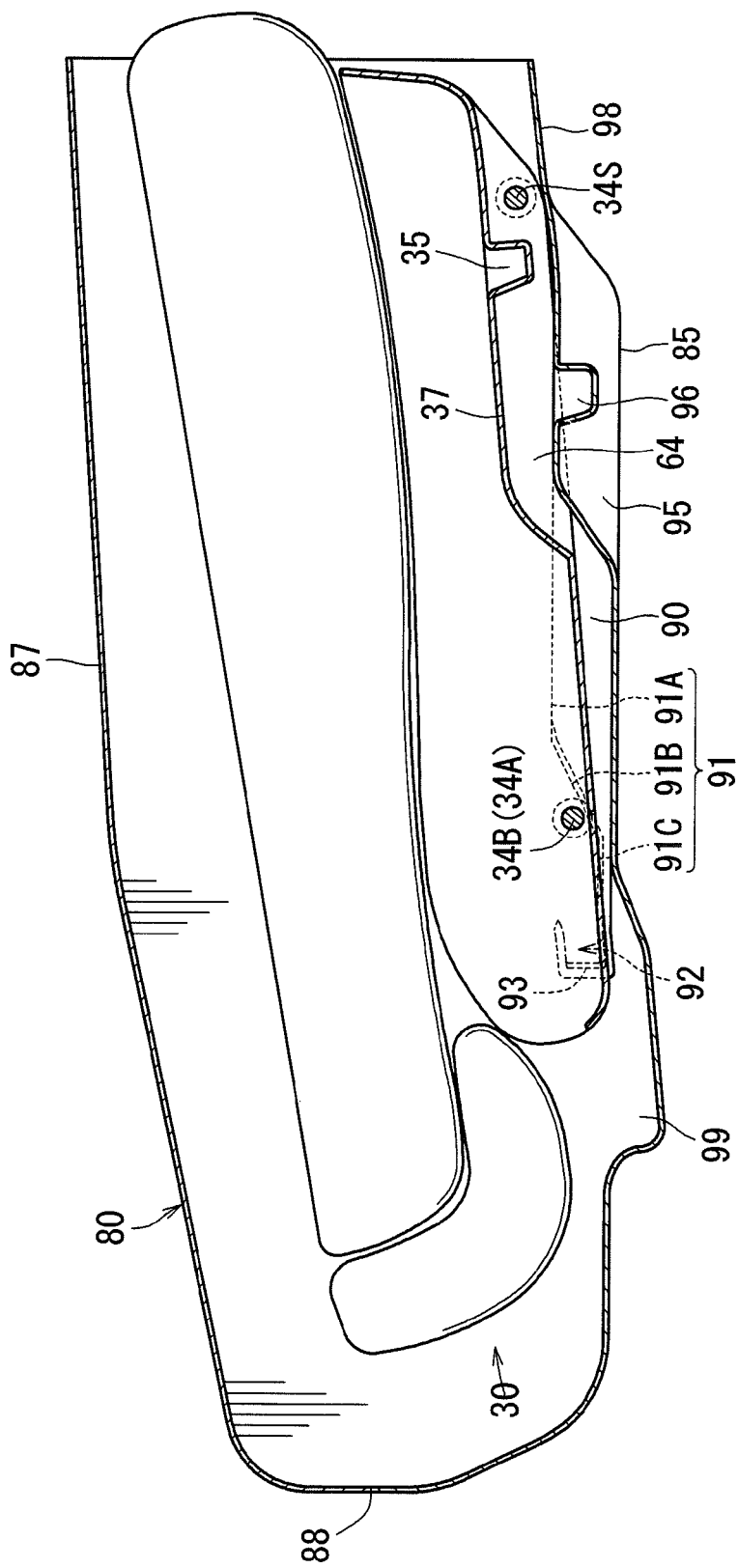
FIG. 19 is a sectional side view showing an intermediate state of storing the central seat to the storage container of the same configuration.

When the central seat 30 is slid toward the back side of the storage container 80 further from the state shown in FIG. 18, as shown in FIG. 19, the locking pins 34A, 34B of the central seat 30 come to the inclined portions 91B of the rails 91, and the flange portions of the locking pins 34A, 34B are fitted into the grooves 93 formed to be recessed from the inclined portions 91B. At this occasion, since the inclined portions 91B decline toward the back side, also the front side of the central seat 30 is inclined toward a lower side. With this, the locking pins 34A, 34B are prevented from being removed from the grooves 93 by the own weight of the central seat 30. Further, even in this positioned state, the rear side of the lower surface of the central seat 30 is in contact with the rear edge portion 98 of the bottom wall 85. Further, because the recess 37 of the undercover 64 and the raised portion 95 of the bottom wall 85 are fitted to each other as the front side of the central seat 30 is inclined toward the lower side, the subsequent sliding operation can smoothly be carried out without causing to shift in the left and right direction.

Figure 20:
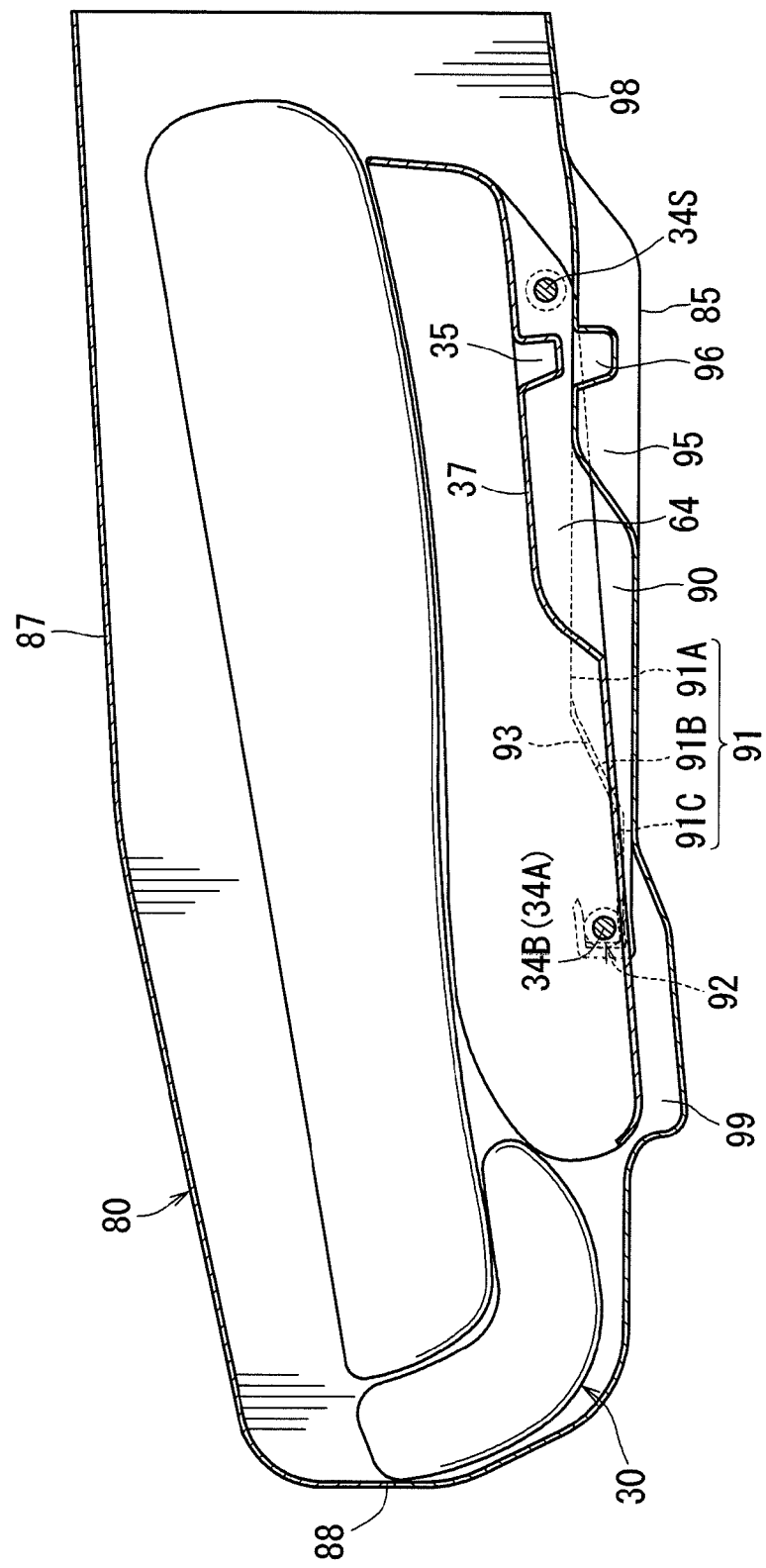
FIG. 20 is a sectional side view showing a state immediately before fixing the central seat to the storage container of the same configuration.
Figure 21:
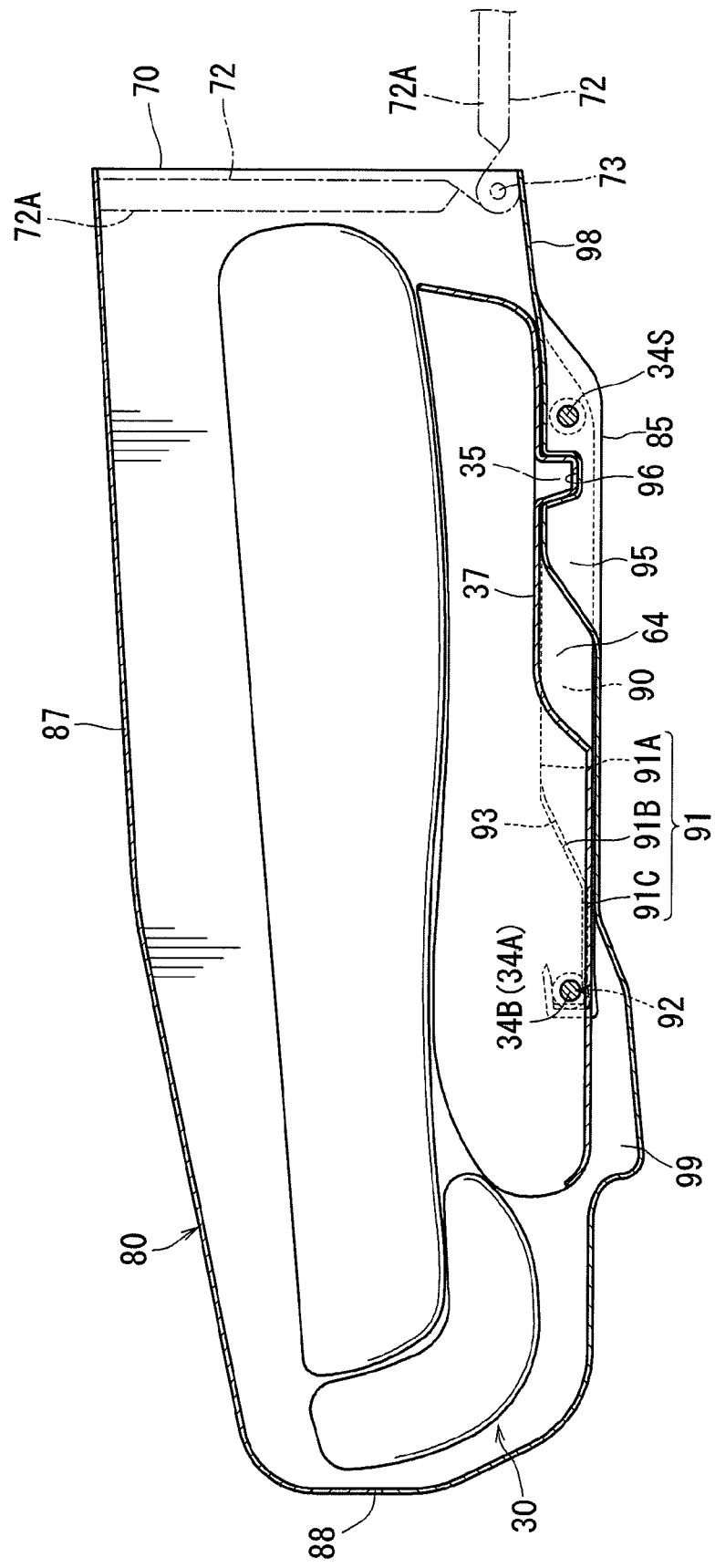
FIG. 21 is a side sectional view showing the storing structure of the same configuration.

Further, after the rear end of the lower face of the central seat 30 has come to the back position beyond the back end of the rear edge portion 98 of the bottom wall 85 by the sliding movement of the central seat 30 toward the back side of the storage container 80 from the state shown in FIG. 19, the projection 35 of the undercover 64 of the central seat 30 is slid on the raised portion 95. Thereafter, when the central seat 30 is slid further toward the back side of the storage container 80, as shown in FIG. 20, the locking pins 34A, 34B are brought to abut to the fixing portions 92 at the back ends of the rails 91, so that further sliding movement toward the back side is restricted. The central seat 30 is slid toward the back side to reach this position while maintaining the inclination state, however, the recess portion 99 is formed to be recessed on the back side of the bottom wall 85, and therefore, the situation where the front side of the central seat 30 is brought into contact with the bottom wall 85 to prevent the sliding insertion is avoided. Finally, the rear side of the central seat 30 is lowered from the state shown in FIG. 20, and as shown by FIG. 21, the projection 35 of the central seat 30 is fitted to be fixed to the fitting recess portion 96 recessed at the raised portion 95 of the bottom wall 85. Further, the projection 35 and the fitting recess portion 96 can be fitted to each other to some degree by free fall due to the own weight of the central seat 30, however, in order to fit further firmly, it is preferable to press the rear side of the central seat 30 toward the lower side. At this occasion, the striker 34S disposed on the rear side of the central seat 30 is stored between the bulged portion 90 and a rearwardly inclined face of the bottom wall 85.

In this way, the central seat 30 is firmly fixed within the storage space without being rattled in the front and rear, left and right and up and down directions by the fixing portion 92 and the fitting recess portion 96, and generation of sound of interference between the central seat 30 and the storage container 80 is inhibited. Further, as better shown in FIG. 21, a height dimension of the fixing portion 92 from the bottom wall 85 (more specifically, recess portion 96) is larger than a height dimension of the locking pins 34A, 34B from the bottom face of the central seat 30, and therefore, when the central seat 30 is stored to be fixed within the storage space, the front side of the central seat 30 is in a state of floating within the storage space. Therefore, because a contact area between the central seat 30 and the storage container 80 is small, generation of sound of interference between the central seat 30 and the storage container 80 is inhibited as small as possible, even in the case that a large impact is applied during traveling of and automobile or the like. Further, when the central seat 30 is slid to be inserted, it is not necessary to lift and support the rear side of the central seat 30 toward the upper side. Therefore, in order to store the central seat 30, only a force for slidably operating the central seat 30 in the front and rear directions is needed, so that the storing operation can easily be carried out.

As is apparent from the above explanation, the structure of storing and guiding the central seat 30 formed by the left and right side walls 86 and the extending portions 90 and the like of the storage container 80 corresponds to "guide structure constituted at the storage container" referred to in the present invention. According to the guide structure of the storage container 80, during the time when the central seat 30 is guided by the guide structure between the central seat 30 and the support base 40 explained above, a portion of the central seat 30 is fitted and guided. For example, a so-to-speak headrest portion constituting the front end portion of the folded central seat 30 is fitted and guided.

Further, the above explanation was made to the case that the central seat 30 of the second row is detached from the support base 40 and is stored and moved to the storage container 80. Conversely, the operation of setting and moving the seat for fixing to the support base 40 in order to utilize the central seat 30 stored within the storage container 80 as an auxiliary seat of the second row, may be carried out by reversing the above operation. In this case, the stored central seat 30 is moved toward a position of installing the central seat 30 of the second row under the guide of the guide structure formed by the storage container 80.

As an additional structure to the first embodiment, as indicated by a one-dotted chain line in FIG. 21, a pivotable lid 72 may be provided at an inlet opening portion 70 of the storage container 80, and a guide structure for the central seat 30 which is stored and moved may be provided at the pivotable lid 72. In this case, the pivotable lid 72 is provided to pivot between a closed state of closing the inlet opening portion 70 and a state of contacting with the floor by using a coupling pin 73 attached to the side wall 86 as a pivot shaft. Both sides in the width direction of the pivotable lid 72 are formed with guide side walls 72A which can guide to store and move the folded central seat 30.

In the case that the central seat 30 is stored and moved to the storage container 80, the pivotable lid 72 is opened from the inlet opening portion 70 to be brought into a state of contacting with the floor before being guided by the guide structure of the main body of the storage container 80 mentioned above, so that the central seat 30 can be guided by the guide side walls 72A of the pivotable lid 72 constituting the storage container 80. With this, an interval between the support base 40 and the main body of the storage container 80 can be set to be longer. Further, in a state of closing the inlet opening portion 70 by the pivotable lid 72, the stored central seat 30 can be concealed and the appearance also is improved.

Next, a second configuration of the storing structure will be explained. The second configuration is basically the same as the preceding first embodiment and is different only in that the extending dimension of the extending portions 90 formed to extend from the left and right side walls 86, 86 of the storage container 80 is set to be larger than in the first embodiment. In details, the width dimension between the left and right extending portions 90, 90 is set to be smaller than the width dimension of the front end bulged portion 67A of the undercover 64 of the central seat 30 and to be larger than the width dimension of the undercover 64 of the bulged portion 67 except for the front end bulged portion 67A.

With this, when the central seat 30 is slid to be inserted into the storage container 80 from a front side thereof, the front end bulged portion 67A of the undercover 64 is slid on the horizontal portion 91A of the rail 91. At this occasion, the locking pins 34A, 34B are not brought into contact with the rails 91. And, when the central seat 30 is further slid to move toward the back side of the storage container 80 and the front end bulged portion 67A of the undercover 64 goes beyond the fixing portion 92 of the rail 91, the front side of the central seat 30 falls toward the lower side, so that the locking pins 34A, 34B are brought into contact with the rails 91. At this occasion, the locking pins 34A, 34B fall exactly onto the inclined portions 91B of the rails 91, and therefore, the flange portions of the locking pins 34A, 34B are fitted into the grooves 93 of the rails 91 at the same time. Thereafter, the central seat 30 may be operated to slide and fixed to the storage container 80 in the same manner as the first embodiment.

Figure 22:
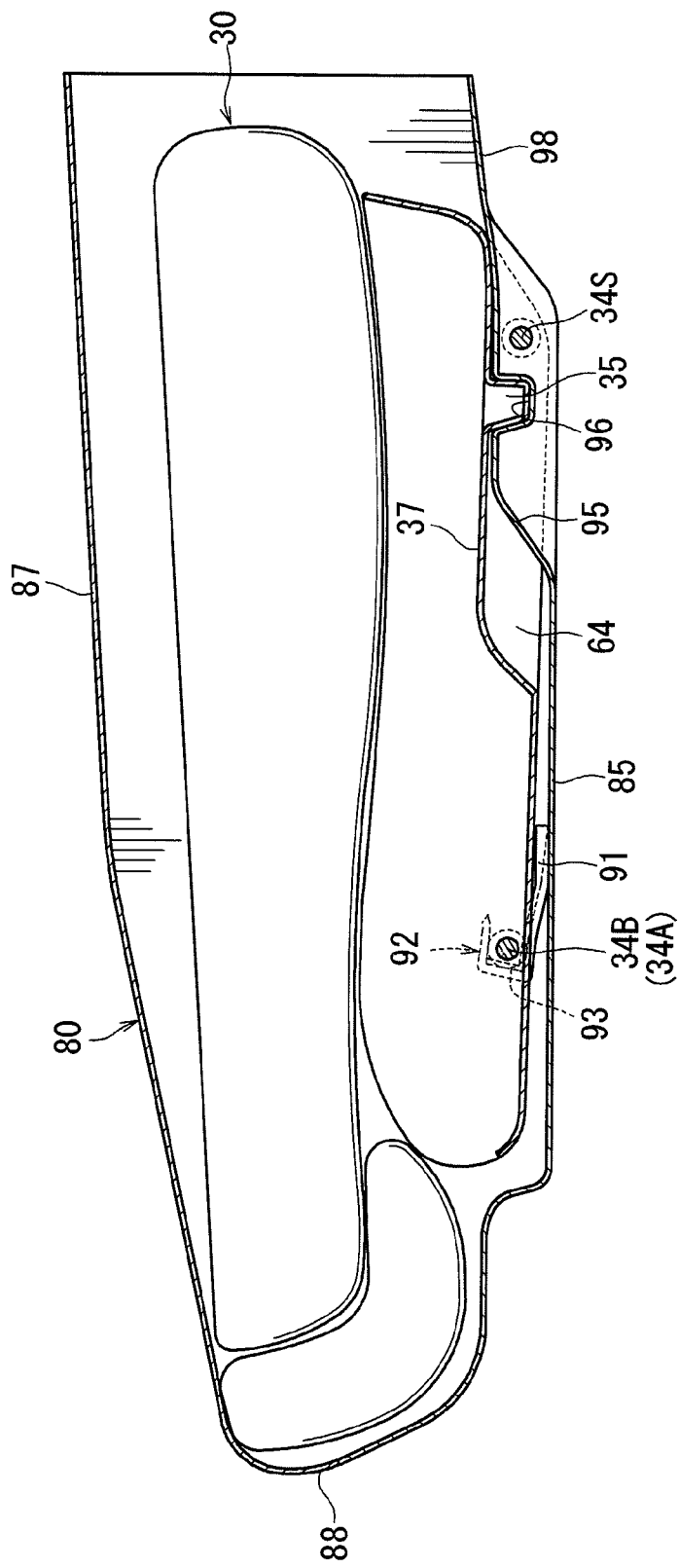
FIG. 22 is a perspective view showing a storage container of a third configuration of a storing structure.

Next, a third configuration of a storing structure will be explained. As shown in FIG. 22, it may be constructed such that the horizontal portion 91A of the rail 91 is omitted and that the lower face of the central seat 30 is slid on the bottom wall 85 of the storage container 80. Even when the lower face of the central seat 30 is slid on the bottom wall 85 of the storage container 80 in this way, the recess 37 of the undercover 64 and the raised portion 95 of the bottom wall 85 are fitted to each other while being capable of sliding in the front and rear directions, and therefore, the central seat 30 can be slid to be inserted without causing to shift in the left and right directions. Therefore, in order to reliably receive the locking pins 34A, 34B, a start end (rear side) of the rail 91 is set to a height position to cause contact with the bottom wall 85. In this case, the extending portion 90 formed to extend from the side wall 86 is not necessarily needed. Further, in order to maintain the front side of the central seat 30 in an inclined position floating up from the bottom wall 35, the rail 91 is inclined upward toward the back side. Therefore, the height dimension of the fixing portion 92 from the bottom wall 85 is set to be higher than the height dimension of the locking pins 34A, 34B from the bottom face of the central seat 30.

Further, on the rear side of the central seat 30, the projection 35 of the undercover 64 is successively slid from the rear edge portion 98 of the bottom wall 85 to the raised portion 95. Further, at the same time that the locking pins 34A, 34B abuts to the fixing portions 92 of the rails 91, the projections 35 may be fitted to be fixed to the fitting recess portion 96 by the own weight of the central seat 30 or by the pushing down toward the lower side. Further, according to this configuration, it is not necessary to form the recess portion 99 on the back side of the bottom wall 85 by two reasons in that there is no inclining action of the front side of the central seat 30 toward the lower side and that, since the fixing portion 92 is inclined toward the upper side, the front side of the central seat 30 is floated up from the bottom wall 85 when the central seat 30 is stored and fixed within the storage space. Further, the central seat 30 is inclined and fixed within the storage space, and therefore, the own weight of the central seat 30 is concentrated to a fitting portion between the projection 35 and the fitting recess portion 96, and therefore, the projection 37 can be prevented from being easily removed from the fitting recess portion 96.

Next, a specific embodiment of the seat attaching and detaching mechanism integrated to the structure of storing a seat for an automobile of the above embodiment for achieving the secondary problem of the invention will be explained. With regard to the seat attaching and detaching mechanism, an outline thereof was explained in the above embodiment, and therefore, in explaining the specific structure, there may be a case that the explanation is made with partly repeating the content explained in the above embodiment.

Figure 3:
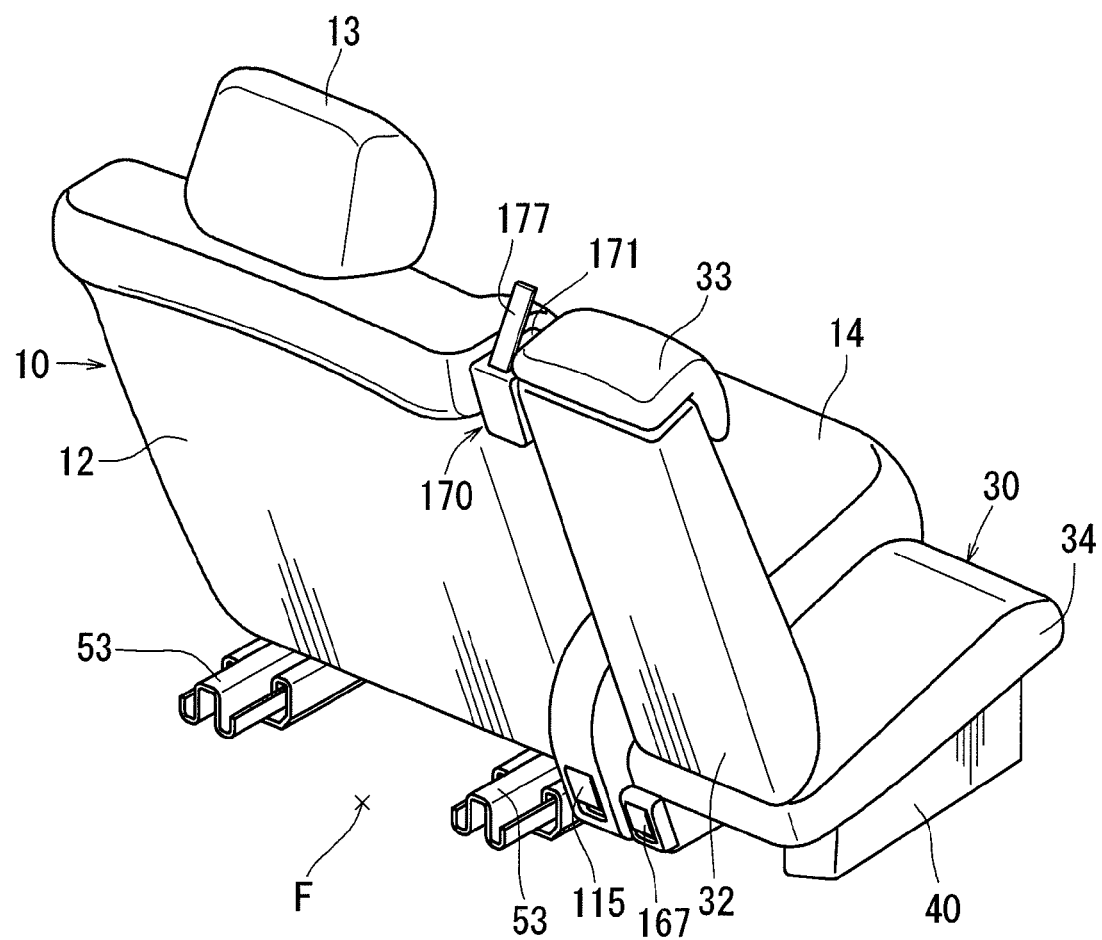
FIG. 3 is a perspective view showing a back face side of the central seat.

First, in FIG. 1 through FIG. 3, the two side seats 10, 20 include the seat backs 12, 22 as the backrests, the seat cushions 14, 24 as the seating portions, headrests 13, 23 supporting the head portions, and the arm rests 12A, 22A as arm rests. The seat backs 12, 22 are capable of adjusting their angles relative to the seat cushions 14, 24 by generally well-known reclining mechanisms (not illustrated) arranged within the seats. Symbol 115 in FIG. 3 designates a release lever for operating to release the lock state of the reclining mechanism of the left side seat 10. Further, in FIG. 3, illustration of the right side seat 20 is omitted. Further, the arm rests 12A, 22A are capable of adjusting between an upright attitude in a non-use state and a sideways fallen attitude in a used state relative to the seat backs 12, 22 by hinges (not illustrated) disposed within the seats.

Further, in FIG. 1 through FIG. 3, the central seat 30 of this embodiment includes the seat back 32 as the backrest, the seat cushion 34 as the seating portion, and a headrest 33 for supporting the head portion, and as indicated by an imaginary line in FIG. 2, in a state of being mounted onto the support base 40, the central seat 30 is proximate to or closely contacts with the two side seats 10, 20. Further, the seat back 32 is always urged toward a front folding direction by a wound spring, not illustrated, disposed at a connecting portion between the seat back 32 and the seat cushion 34 within the central seat 30. The central seat 30 is attachable and detachable to and from the support base 40 by the engagement with engaging means arranged and formed on the lower face side of the seat cushion 34 and engaging means of the support base 40 provided in correspondence therewith. A detailed structure of the engaging means and an attaching and detaching mechanism from the support base 40 based on the engaging means will be described later.

Further, at the upper portion of a side face of the seat back 32 on the side of the left side seat 10, there is arranged a striker 135 in a shape of a gate type frame inclinable between a retreated attitude folded to be oriented downward and extending along the side face of the seat back 32, and a projected attitude extending toward an outer side in the width direction horizontally from the side face of the seat back 32. Further, in a mounting state of the central seat 30 onto the support base 40, when a usage attitude in which the seat back 32 is upright relative to the seat cushion 34 as indicated by imaginary lines in FIG. 2 is taken, the striker 135 is engaged to be locked against a back lock apparatus 170 provided at a shoulder portion of the seat back 12 of the left side seat 10. With this, the upright attitude (usage attitude) of the seat back 32 of the central seat 30 is maintained in such a manner that it leans on the seat back 12 of the left side seat 10 by the back lock apparatus 170. When the lock state of the back lock apparatus 170 is released, the seat back 32 is tilted down toward the front side.

As shown in FIG. 3, the back lock apparatus 170 is arranged at the shoulder portion of the upper portion of the arm rest 12A on an outer side of the side face of the seat back 12 of the left side seat 10 on the side of the central seat 30, and because its entire periphery is covered by a cover 171, the back lock apparatus 170 basically cannot be visually recognized from outside. Further, the back lock apparatus 170 is configured to be engaged and locked by receiving the striker 135 of the central seat 30 within a receiving inlet 172 opened toward the vehicle front direction, and it is possible to operate to release the lock state by operating to pull a strap 177 extending outward from the upper face of the cover 171.

Figure 6:
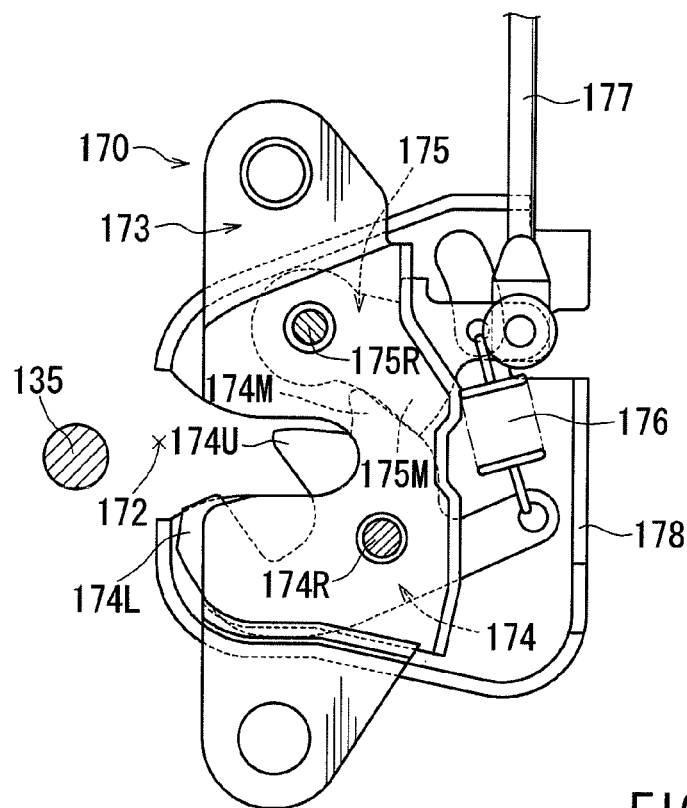
FIG. 6 is a structural view showing a lock release state of a back lock apparatus.

Specifically, as shown in FIG. 6 and FIG. 7, the back lock apparatus 170 includes a base 173 integrally fixed to an inner frame of the left side seat 10, a hook 174 for locking the striker 135, a pawl 175 for locking the hook 174, a tension spring 176 engaged between the hook 174 and the pawl 175, the strap 177 connected to the pawl 175 for operating to release the lock state of the back lock apparatus 170, and a bracket 178 for partitioning an outer side of the back lock apparatus 170. The base 173 and the bracket 178 are constructed to be arranged in an opposed manner while being spaced apart from each other by a predetermined interval, and the hook 174 and the pawl 175 are arranged therebetween.

The hook 174 is pivotally connected to be able to pivot relative to the base 173 and the bracket 178 via a connecting shaft 174R bridged between the base 173 and the bracket 178 that are opposed to each other. The hook 174 is formed with an inner jaw portion 174U and an outer jaw portion 174L by forming its outer peripheral edge portion partially into an undulated shape. The hook 174 is always urged in a counterclockwise direction by a biasing force of the tension spring 176 engaged between the hook 174 and the pawl 175 described later, and as shown in FIG. 6, an outer peripheral edge portion on the side opposite to the pawl 175 is maintained at a pivoted position interfering with the base 173. With this, the hook is in an attitude state that the inner jaw portion 174U is exposed to inside of an opening of the receiving inlet 172 and the outer jaw portion 174L is retreated to the outside of the opening of the receiving inlet 172. Further, an outer peripheral edge portion on a side of the pawl 175 is continuously formed, in a manner adjacent to the inner jaw portion 174U, with a locking jaw portion 174M contacting with the pawl 175.

The pawl 175 is pivotally connected to be pivotable relative to the base 173 and the bracket 178 via a connecting shaft 175R bridged between the base 173 and the bracket 178 that are opposed to each other. The pawl 175 is always urged in a clockwise direction by the biasing force of the tension spring 176 engaged between the pawl 175 and the hook 174, and as shown in FIG. 6, a locking claw 175M formed at an outer peripheral edge portion thereof on the side of the hook 174 and having an angled portion is held in an attitude of being pressed against an outer edge of the locking jaw portion 174M of the hook 174.

The back lock apparatus 170 constructed as described above is operated as follows in accordance with a movement of the striker 135 of the central seat 130 to enter inside of the receiving inlet 172. That is, as the striker 135 enters into inside of the receiving inlet 172 from the state shown in FIG. 6, the inner jaw portion 174U of the hook 174 exposed to inside of the opening of the receiving inlet 172 is pressed by the striker 135 as shown in FIG. 7, and the hook 174 is pivoted in the clockwise direction. In accordance therewith, the inner jaw portion 174U is pushed to the outside of the receiving inlet 172, and the outer jaw portion 174L is exposed to inside of the opening of the receiving inlet 172 in such a manner that it moves around to the back of the striker 35. Further, in accordance with the pivoting of the hook 174 in the clockwise direction, the locking claw 175M of the pawl 175 gores over the locking jaw portion 174M and falls into a depression between the inner jaw portion 174U and the locking jaw portion 174M of the hook 174 by the biasing force of the tension spring 176. In this state, the locking jaw portion 174M is locked by the locking claw 175M, and therefore, the hook 174 is brought into a state where it is prevented from being pivoted in the counterclockwise direction by the biasing force of the tension spring 177, and this state is maintained as an engaging lock state of locking the striker 135.

In the case that the engaging lock state is released, it is performed by operating to pull the strap 177 connected to the pawl 175 from the upper face of the cover 171. Specifically, when the strap 177 is operated to pull against the biasing force of the tension spring 176 from the state shown in FIG. 7, the pawl 175 is operated to pivot in the counterclockwise direction, and the locking claw 175 goes over the locking jaw portion 174M to bring about a state shown in FIG. 6, in which the state of locking the hook 174 and the pawl 175 is released. With this, as the hook 174 pivots in the counterclockwise direction by the biasing force of the tension spring 176, the engagement between the striker 135 and the outer jaw portion 174L of the hook 174 is released, and the striker 135 is discharged to the outside of the opening of the receiving inlet 172.

Next, the structure of the central seat 30 will be explained. As shown in FIG. 4, on the lower face side of the seat cushion 34 of the central seat 30, the striker 34S in the shape of a pin on the rear side of the seat, the two left and right locking pins 34A, 34B on the front side of the seat, and the positioning hole 34H on the rear side of the seat and on the side opposite to the striker 34S in the width direction, which constitute means for engaging with the support base 40 are respectively arranged. The striker 34S and the locking pins 34A, 34B are provided to extend from the left and right side faces of the undercover 64 made of synthetic resin covering the lower face side of the seat cushion 34 to the outside in the width direction, and are constituted by the pin portions 34Sa, 34Aa, 34Ba in shapes of round bars, and the flange portions 34Sb, 34Ab, 34Bb integrally formed continuously to the front ends of the pin portions. Outwardly projecting amounts of the striker 34S and the locking pins 34A, 34B in the width direction from the undercover 64 is set to be substantially the same as the width dimension of the central seat 30. Further, although the striker 34S and the locking pins 34A, 34B have the same shape as better shown in FIG. 4, etc., their functions are different as described later, and therefore, member names of the two members 34S, 34A, 34B are differently determined.

As shown in FIG. 9 showing the inner frame structure of the central seat 30, the locking pins 34A, 34B are constituted by shapes of respective end portions of the pin members extending in the width direction integrally with the cushion frame 34F at positions on the front side of the lower portion of the cushion frame 34F constituting the skeleton of the seat cushion 34. The positioning hole 34H is formed to penetrate the bracket 39 in a shape of a metal plate provided in a manner extending outward in the width direction and integral with the cushion frame 34F at a position on the rear side of the lower portion of the cushion frame 34F. The striker 34S is provided to extend outward in the width direction and integrally with the cushion frame 34F at a position on one side opposite to the plate-like bracket through which the positioning hole 34H is formed to penetrated on the rear side of the lower portion of the cushion frame 34F (specifically, on the side of the left side seat 10). The seat cushion 34F is constituted by covering the lower face of the cushion frame 34F, which integrally includes the striker 34S, the locking pins 34A, 34B and the positioning hole 34H, by the undercover 64. As shown in FIG. 4, at positions of the undercover 64 in correspondence with the locking pins 34A, 34B, the flexible rubber fins 139 having the cuts 138 in the T-like shape are arranged. On this condition, for attaching the undercover 64, its rear side is first applied to the lower face of the cushion frame 34F, and the striker 34S is brought to project to the outside. Then, the front side is also applied to the lower face of the cushion frame 34F by passing the locking pins 34A, 34B through the cuts 138 of rubber fins 139, so that the lower face of the seat cushion 34 can be covered. Further, at the front end portion of the undercover 64, the front end bulged portion 67A having the width wider than those of the portions formed with the striker 34S and the locking pins 34A, 34B is formed.

Referring back to FIG. 9, the above-descried gate type striker 135 is connected to the back frame 32F constituting the skeleton of the seat back 32 via a hinge. The striker 135 can be switched about the hinge point between an attitude state projecting horizontally on the lateral side of the seat back 32 (solid line state in the figure), and an attitude state folded to be oriented in the lower direction and positioned along the side face of the seat back 32 (imaginary line state in the figure). Specifically, the striker 135 is always urged to project laterally of the seat back 32 by a torsional spring, not illustrated, engaged between the striker 135 and the back frame 32F. Here, an operation cable 140 is connected between the striker 135 and the cushion frame 34F. The operating cable 140 is set in size to have a length enabling a state tensioned between the striker 135 and the cushion frame 34F just when the seat back 32 is brought into an upright attitude raised from the seat cushion 34. Therefore, in the upright attitude of the seat back 32 taken by being raised, the striker 135 is maintained as the attitude state projecting laterally of the seat back 32 by the biasing force of the torsional spring, however, when the seat back 32 is folded to the upper side of the seat cushion 34, the striker 135 is folded toward the side of the seat back 32 against the biasing force of the torsional spring because the operating cable 140 is pulled. With this, the striker 135 is held to be folded in such a manner that it is positioned along the side face of the seat back 32 as better shown in FIG. 2 in accordance with the folding action of the seat back 32.

On the other hand, on the upper face side of the support base 40, the cushion lock apparatus 46, the locking recess portions 43A, 45A, and the positioning pin 43B constituting the engaging means between the central seat 30 and the support base 40 are arranged respectively in correspondence with the striker 34S, the locking pins 34A, 34B, and the positioning hole 34H provided at the above-described central seat 30. The support base 40 is constructed by covering the frame structure integrally fixed to the cushion frame 14F of the left side seat 10 by the surface cover 62 made of synthetic resin.

Specifically, in FIG. 10 showing the frame structure of the support base 40, two front and rear pipe-like support frames 41, 42 made of a metal and constituting the skeleton are disposed to extend and to be integrally fixed to the cushion frame 14F on the side of the central seat 30 of the left side seat 10. The front and rear support frames 41, 42 are integrally coupled with the reinforcement frame 43 in the shape of a long plate made of metal and bridging between the both members 41, 42 at right ends thereof (the side of the right side seat 20). The reinforcement frame 43 is coupled to the front and rear support frames 41, 42 in such an attitude that the plate is positioned upright while being turned sideways. Further, the front and rear support frames 41, 42 are also integrally coupled with the reinforcement plate 44 in the shape of a long thin plate made of metal and bridging therebetween at the center positions in the width direction. With this, the frame structure of the support base 40 is constructed to be improved in the support rigidity of the torsional rigidity or the like and in the support strength.

Further, the locking recess portion 43A on the right side (side of the right side seat 20) is formed to be recessed at the predetermined height position of the front end portion of the reinforcement frame 43 and is constructed such that its opening portion having the recessed shape is oriented toward the front side. Further, the locking recess portion 45A on the left side (side of the left side seat 10) is formed to be recessed at the upper portion of the upright plate 45 upright integrally from the front side support frame 41 and is constructed such that its opening portion having the recessed shape is oriented toward the front side. Further, the positioning pin 43B is provided at the rear end portion of the reinforcement frame 43 integrally therewith and is formed to project toward the upper side from the reinforcement frame 43. Further, the cushion lock apparatus 46 is integrally fixed to the cushion frame 14F of the left side seat 10 and is integrally fixed to the support bracket Fb at which a receiving inlet 166 of the striker 34S is opened in the upward direction. Further, the mechanism of this cushion lock apparatus 46 utilizes basically the same mechanism as the mechanism of the back lock apparatus 170 shown in FIG. 6 and FIG. 7, and therefore, illustration of its details is omitted by substituting the illustration of FIG. 6 and FIG. 7 for that. However, it is constructed such that the operation of releasing the lock state of the cushion lock apparatus 46 is carried out by a release lever 167 provided at a back face of the cushion lock apparatus 46 (support base 40) as shown in FIG. 3 in place of the strap 177 of the back lock apparatus 170. Further, a mechanism for receiving the striker 34S from the upper side and locking the same is constituted by the receiving inlet 166 opening in the upper direction.

On this condition, the frame structure of the support base 40 shown in FIG. 10 is covered by the surface cover 62 as shown in FIG. 4. The surface cover 62, which is disposed in such a manner that it covers to conceal the entire upper face side of the support base 40, is formed into a shape having the seat plate portion 62A in the shape of the flat plate, and the right side wall portion 62R (left side in FIG. 4) and the left side wall portion 62L (right side in FIG. 4) formed in the shape raised at the both end portions in the width direction. The right side wall portion 62R formed on the left side in the drawing is formed in such a manner that it covers to conceal the reinforcement frame 43 mentioned above in FIG. 10. In details, the right side wall portion 62R is formed into a shape with hollowed portions where the locking recess portions 43A, 45A and the positioning pin 43B constituting components of the engaging means are disposed. With this, the locking recess portions 43A, 45A are constructed such that they are embedded into the surface cover 62 in an external appearance by a state in which the locking recess portions 43A, 45A are exposed to the outside in the front direction although surroundings thereof are covered by the right side wall portion 62R. In details, the hollowed opening shape of the right side wall portion 62R is a shape hollowed such that the opening portion in the recessed shape of the locking recess portion 43A is exposed toward the front side and the right side in the drawing.

Further, also the left side wall portion 62L formed on the right side of the drawing is formed in such a manner that it covers to conceal the upright plate 45 and the cushion lock apparatus 46 mentioned above in FIG. 10. In details, the left side wall portion 62L is formed to have a shape with hollowed portions where the locking recess portion 45A and the cushion lock apparatus 46 constituting components of the engaging means are disposed. With this, the locking recess portion 45A and the cushion lock apparatus 46 are constructed such that they are embedded within the surface cover 62 in there external appearances by the state in which the locking recess portion 45A is exposed to the outside in the front direction and the cushion lock apparatus 46 is exposed to the outside in the upper direction, respectively, although their surroundings are covered by the left side wall portion 62L. In details, the hollowed opening shape of the left side hole portion 62L is a shape hollowed such that the opening portion in the recessed shape of the locking recess portion 45A is exposed toward the front side and the left side in the drawing and that the cushion lock apparatus 46 is exposed toward the upper side and the left side in the drawing. Further, at the hollowed opening portion of the left side hole portion 62L arranged with the cushion lock apparatus 46, the flexible rubber fin 47 formed with the cut 48 in the T-like shape is provided, and the cushion lock apparatus 46 cannot be visually recognized from its external appearance because it is covered by the rubber fin 47. Further, at corner portions on an upper side of front ends of the left and right side wall portions 62L, 62R, two left and right ribs 157 are formed to project integrally toward the upper side of the surface cover 62 to enable the operation of detaching the central seat 30 from the support base 40 to be smoothly performed.

The central seat 30 is operated to be detached from the support base 40 constructed as described above in the following manner. First, in a usage state in which the central seat 30 is mounted onto the support base 40 and the seat back 32 is upright, the striker 135 provided at the shoulder of the seat back 32 is engaged to be locked against the back lock apparatus 170 of the left side seat 10, and the striker 34S on the rear side of the lower face side of the seat cushion 34 is engaged to be locked against the cushion lock apparatus 46 of the support base 40. Further, the two locking pins 34A, 34B on the front side of the lower face side of the seat cushion 34 are engaged with the left and the right locking recess portions 43A, 45A of the support base 40, and similarly, the engaging hole 34H on the lower face side of the seat cushion 34 is engaged with the positioning pin 43B projecting from the support base 40 toward the upper side. That is, a lock mechanism as engaging means is constituted by the striker 34S of the central seat 30 and the cushion lock apparatus 46 of the support base 40, and an engaging mechanism as engaging means is constituted by the locking pins 34A, 34B of the central seat 30 and the locking recess portions 43A, 45A of the support base 40.

Figure 23:
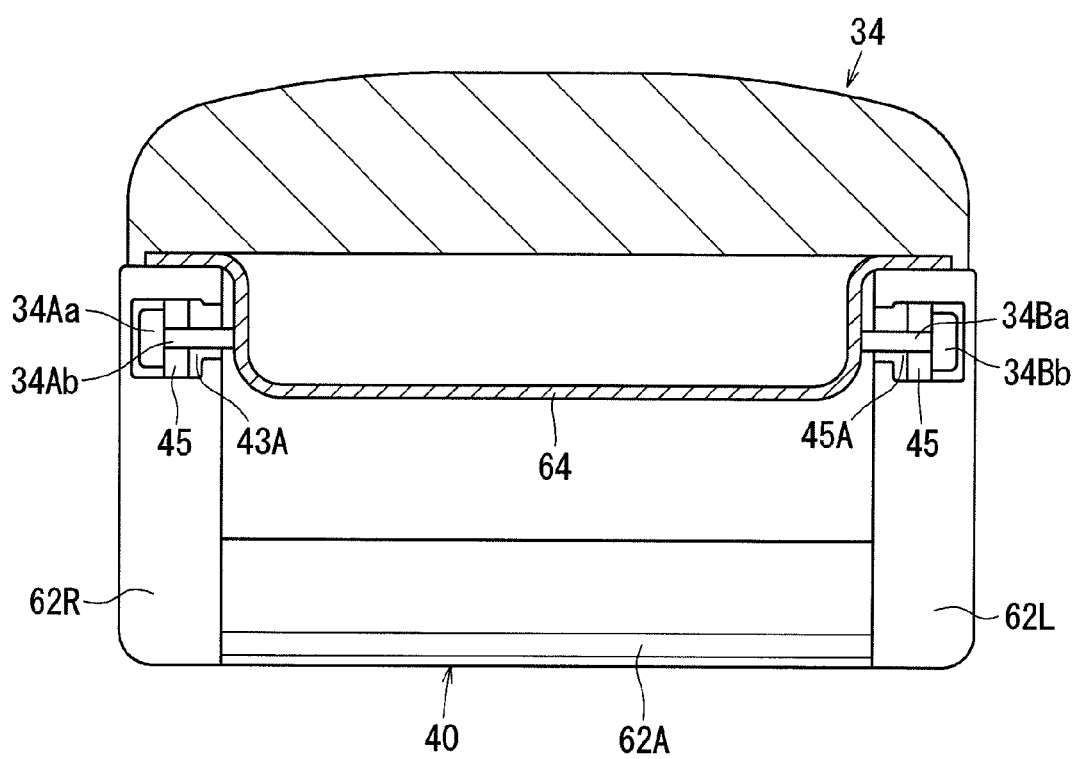
FIG. 23 is a partially sectional front view of a state of mounting the central seat to the support base.

At this occasion, the central seat 30 is locked by the cushion lock apparatus 46 and the back lock apparatus 170, and therefore, the central seat 30 is basically reliably locked without causing rattling, and as shown in FIG. 23, the left and right locking pins 34A, 34B are prevented from rattling in the width direction of the central seat 30 because the pin portions 34Aa, 34Ba are received by the reinforcement frame 43 and the upright plate 45 within the locking recess portions 43A, 45A and the flange portion 42B is in contact with the outer sides in the width direction of the reinforcement frame 43 and the upright plate 45. Incidentally, FIG. 23 is a front view of a state where the central seat 30 is mounted onto the support base 40, and the seat back 32 is shown in a partial sectional view broken immediately before the locking pins 34A, 34B, and illustration of the internal structure thereof and the seat back 32 and the like is omitted.

Figure 24:
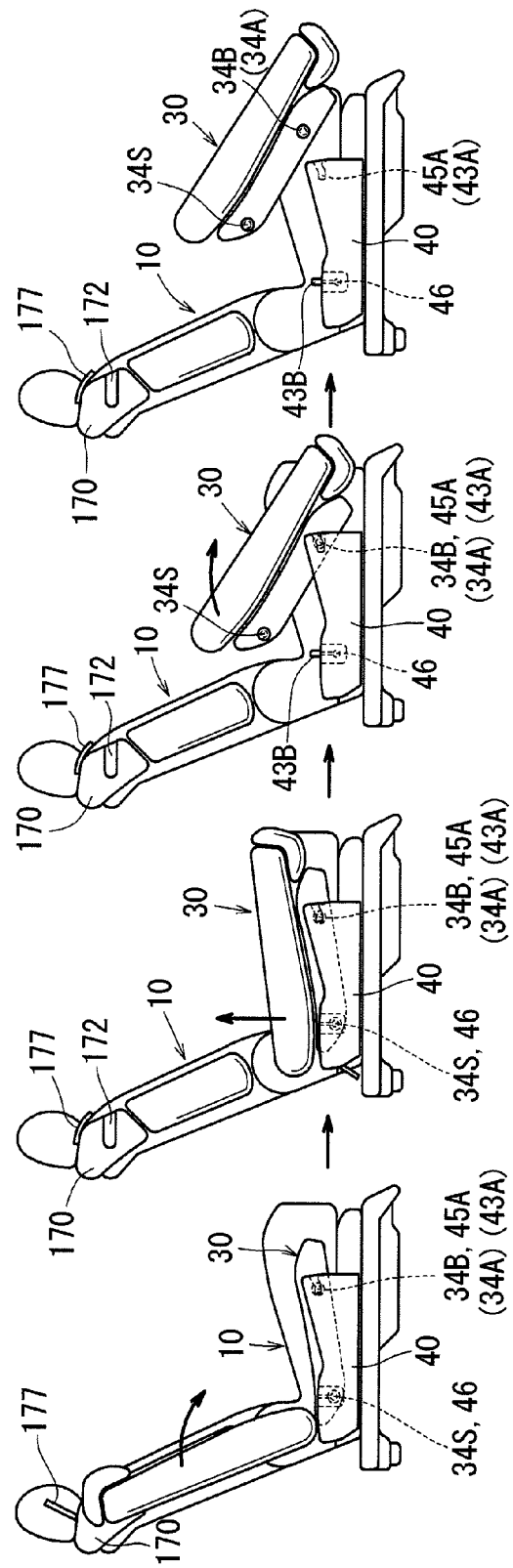
FIG. 24 is a process view showing a series of operating states of detaching the central seat from the support base.

In order to operate to detach the central seat 30 from the support base 40 from the mounting state, as shown by FIG. 24, first, by operating to pull the strap 177 of the back lock apparatus 170 to the upper side, the striker 135 of the central seat 30 is released from being engaged with the back lock apparatus 170. Thereby, the seat back 32 of the central seat 30 is brought down to the front side by the urge force of the spring. Successively, the cushion lock apparatus 46 arranged on the rear side of the support base 40 is released by operating the release lever 167 provided at the back face of the support base 40, the rear side of the central seat 30 is lifted to the upper side under the state, thereby, the striker 34S is released from being engaged with the cushion lock apparatus 46 and the positioning hole 34H is released from being engaged with the positioning pin 43B, respectively. Thereby, the central seat 30 is brought into a first engagement release state relative to the support base 40.

Figure 25:
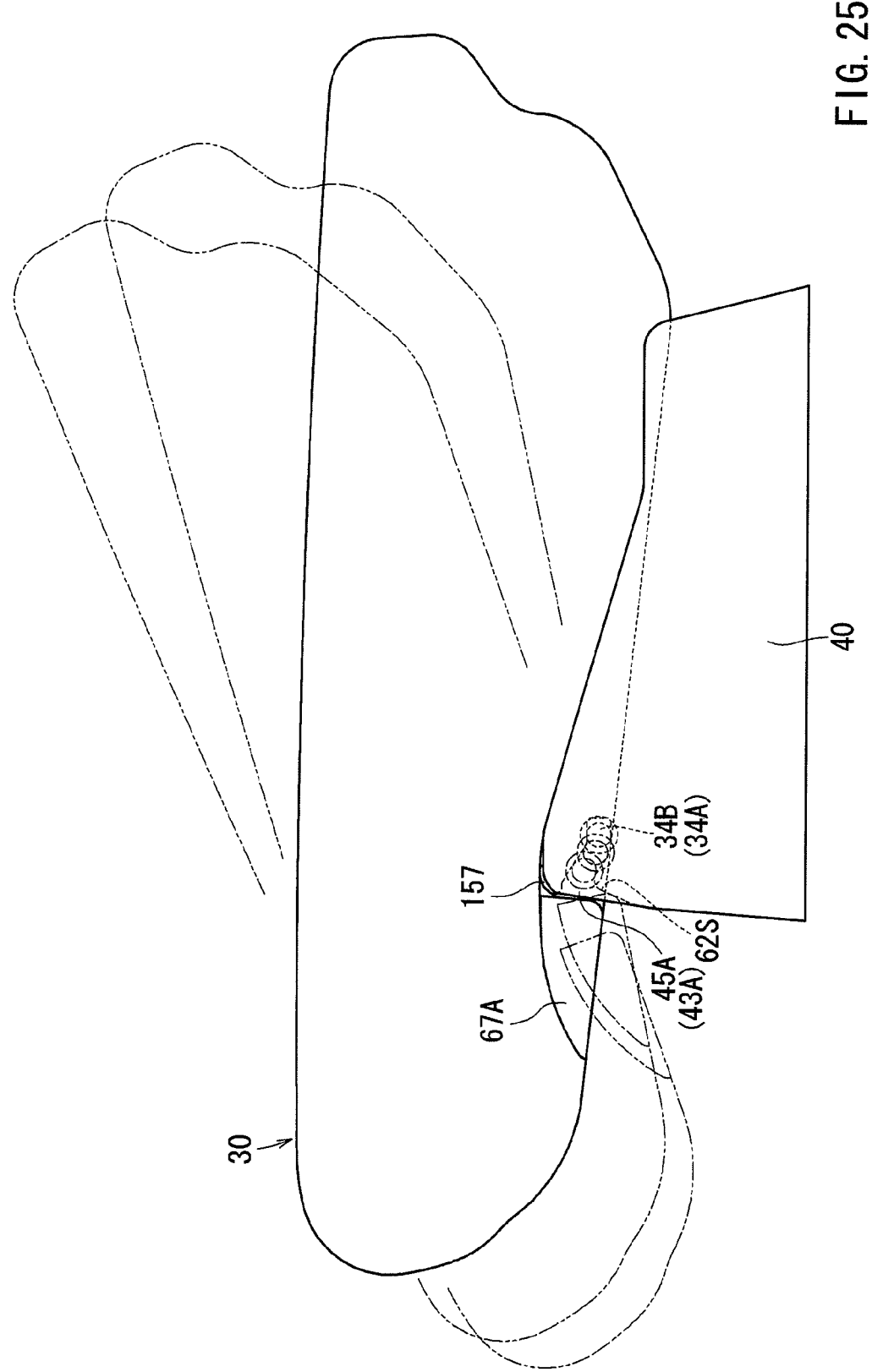
FIG. 25 is a schematic side view showing a state of a mechanism in accordance with an operation of detaching the central seat.

In accordance with an operation of lifting the central seat 30 to the upper side further from the state, the locking pins 34A, 34B on the front side of the central seat 30 are moved from the locking recess portions 43A, 45A of the support base 40 in an engagement release direction. In details, as shown by FIG. 25, when the rear side (side of the striker 34S and the cushion lock apparatus 46) of the central seat 30 is lifted to the upper side as shown by imaginary lines from the mounting state shown by bold lines, a rear lower end corner portion of the bulged portion 67 of the undercover 64 of the seat cushion 34 is brought into contact with the front faces of the left and right side wall portions 62L and 62R of the support base 40. Thereby, by moving the positioning pin 43B to draw a circular are by constituting a fulcrum by the corner portion of the bulged portion 67, the locking pins 34A, 34B are moved in the front upper direction in the locking recess portions 43A, 45A, that is, in directions of openings of the locking recess portions 43A, 45A. Further, when the rear side of the central seat 30 is lifted, the locking pins 34A, 34B are moved in directions of openings of the locking recess portions 43A, 45A while bringing the rear lower end corner portion of the bulged portion 67 into sliding contact with front faces of the side wall portions 62L, 62R to the lower side.

At this occasion, as shown by FIG. 4, at front upper end corner portions of the left and right side wall portions 62L, 62R of the support base 40, the ribs 157 are formed to be projected, and therefore, the attitude operation of the central seat 30 is made to be able to be carried out smoothly. Further, the rear lower end corner portion of the bulged portion 67 is made to be able to be smoothly brought into sliding contact with the front faces of the side wall portions 62L, 62R right below the locking recess portions 43A, 45A to be brought into contact with or sliding contact with the rear lower end corner portion of the bulged portion 67 by forming inclined faces 62S which are inclined to the rear side as proceeding to the upper side. Further, although the locking recess portions 43A, 45A are opened in a skewed upper direction in accordance with movements of the locking pins 34A, 34B, at the same time, the locking recess portions 43A, 45A are constructed also by a constitution in which the locking pins 34A, 34B are not drawn out unpreparedly from the locking recess portion 52 so far as the rear side of the central seat 30 is not lifted to the upper side.

Further, referring back to FIG. 24, when the locking pins 34A, 34B are brought into a state of being moved from the locking recess portions 43A, 45A in the engagement release direction to some degree, the locking pins 34A, 34B are brought into a second engagement release state of being drawn out from the locking recess portions 43A, 45A by moving the central seat 30 to the front side as it is, that is, the engagement is completely released, thereby, the central seat 30 is made to be able to be detached from the support base 40. Summarizing the above-described series of operation, by operating to lift the rear side of the central seat 30 to the upper side in order to release the striker 34S from being engaged with the cushion lock apparatus 46, the locking pins 34A, 34B are made to be able to be released from the locking recess portions 43A, 45A to the front side. That is, there is constituted a mechanism in which the central seat 30 can be detached from the support base 40 by being processed by the two stages attitude operation of first, operating only the rear side to the upper side, successively, operating to the front side as it is. In this meaning, the striker 34S of the central seat 30 and the cushion lock apparatus 46 of the support base 40 correspond to first engaging means according to the invention, and the locking pins 34A, 34B of the central seat 30 and the locking recess portions 43A, 45A of the support base 40 correspond to second engaging means according to the invention. Further, in the meaning described later, the positioning hole 34H of the central seat 30 and the positioning pin 43B of the support base 40 correspond to third engaging means according to the invention. Further, although it is preferable to store the central seat 30 detached from the support base 40 to an exclusive storage space provided at a predetermined portion at inside of the vehicle, when there is not such a storage space, the central seat 30 may only be mounted to a vacant space at inside of the vehicle, or may be put outside of the vehicle.

Next, although an explanation will be given to a mechanism of mounting the central seat 30 to the support base 40 with reference to FIG. 4, basically, the central seat 30 can be mounted thereto by a step reverse to the above-described detaching operation. Specifically, first, the central seat 30 is slid to move to the rear side such that the central seat 30 is slid on the support base 40 in a state of lifting the rear side by making the undercover 64 of the central seat 30 in the folded attitude state disposed on the lower side. Thereby, the pair of left and right locking pins 34A, 34B provided at the front side of the lower face of the seat cushion 34 of the central seat 30 are slid into the left and right locking recess portions 43A, 45A opened at the front face of the support base 40 in a state of being slid.

Figure 26:
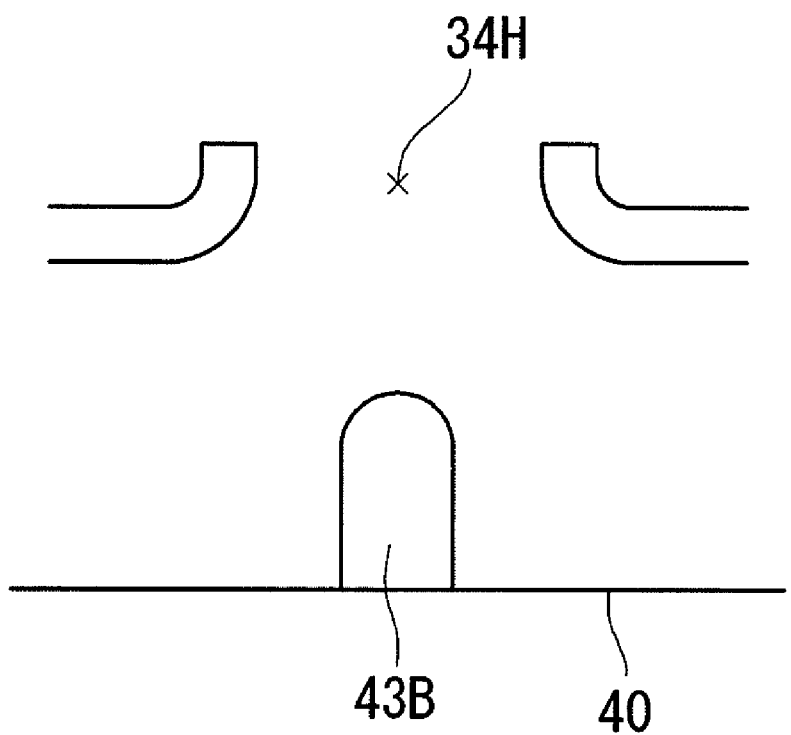
FIG. 26 is an enlarged side view of a primary portion of third engaging means.

Further, when the two locking pins 34A, 34B are brought into contact with depth portions of the two locking recess portions 43A, 45A and a state of restricting the central seat 30 from being slid to move to the rear side is brought about, successively, the rear side of the central seat 30 is operated to drop by constituting a pivoting center by the two locked locking pins 34A, 34B. Thereby, the positioning pin 43B projected to the upper side from the upper face of the support base 40 is received to inside of the positioning hole 34H provided on the rear side of the lower face side of the seat cushion 34 of the central seat 30. At this occasion, as is well shown in FIG. 26, an inner peripheral face of the positioning hole 34H is formed by a shape of a taper a diameter of which is enlarged from the upper side to the lower side, and therefore, the positioning pin 43B can be received in a state of being engaged and guided. This is the reason that the positioning pin 43B and the positioning hole 34H correspond to the engaging pin and the engaging hole as third engaging means according to the invention. Thereby, the positioning pin 43B and the positioning hole 34H are made to function also as positioning means when the central seat 30 is mounted to the support base 40. Further, by dropping the rear side of the central seat 30, the striker 34S is brought from the cut 48 of the rubber fin 47 to inside, and is engaged to be locked to the cushion lock apparatus 46. In this way, by the respective engaging means including the lock mechanism, the central seat 30 is made to be able to be mounted to be fixed to the support base 40 in a state of being restricted from being moved in respective directions of front and rear, left and right and up and down directions relative to the support base 40. Finally, by bringing up the seat back 32 of the central seat 30 to the rear side, and engaging to lock the striker 135 to the back lock apparatus 170 of the left side seat 10, the central seat 30 is maintained in an attitude of being used.

Although the embodiment of the invention has been explained above, the present invention can be embodied in various embodiments other than the above-described embodiment.

For example, in the above embodiment, an explanation has been given to the case in which the removable seat is the central seat performing the function of the auxiliary seat of the second row. However, there may be a case in which the removable seat is constituted by a main seat itself, such as a side seat or the like of the above embodiment.

Further, although in the embodiment, the central seat as the removable seat is of the type integrated with the left side seat. However, the removal seat such as the central seat or the like may be constructed to be disposed on the floor independently of the other seats. Further, the present invention is applicable not only to the vehicle having three seats arranged in the width direction but also to a vehicle having two seats arranged in the width direction. In such a case, the support base may not be limited to be fixed to the left side seat but may be fixed to the right side seat or may be fixedly installed on the floor.

Further, an explanation has been given to the case in which the storage container for storing the removable seat is disposed between the left and right side seats of the first row. However, a position of disposing the storage container may be on the floor within the automobile compartment so far as there is a positional relationship enabling to dispose the guide structure for moving the both members in relation to a seat installing member such as a support base or the like. Further, although an explanation has been given to the case where the storage container in each of the above respective embodiments is provided integrally with the console box, only the storage container may be independently installed.

Further, although the striker and the cushion lock apparatus as the first engaging means of the seat attaching and detaching mechanism, and the engaging pin and the locking recess portion as the second engaging means are indispensable mechanisms, the positioning pin and the positioning hole as the third engaging means may not necessarily be provided. In this case, the engaging pin and the locking recess portion may be formed only on one side in the width direction of the support base. However, in this case, a state of supporting the central seat is a cantilever state, and therefore, attention should be paid for deterioration in stability.

Further, although it is preferable to dispose the striker constituting the first engaging means and the engaging pin constituting the second engaging means on the side of the seat the positioning pin and the positioning hole constituting the third engaging means may be arranged inversely to the constitution shown in the above-described embodiment. That is, the positioning pin constituting the third engaging means may be provided on the side of the seat, and the positioning hole receiving the positioning pin may be provided on the side of the support base.

Further, the first engaging means may be provided on the front side of the seat and the second engaging means may be provided on the rear side of the seat. This case is advantageous when the storage space of the detached seat is provided on the rear side of the vehicle. Further, when the seat for the vehicle of the present invention is applied to two seats aligned in the width direction, the first engaging means and the second engaging means may be provided in an opposed manner in the width direction of the seats. That is, the first engaging means may be provided on the right end side of the seat and the second engaging means may be provided on the left end side of the seat, or may be vice versa.

What is claimed is:

1. A structure for storing a seat for an automobile, comprising:
    a removable seat attachably detachable from a seat installation support disposed on a floor within an automobile compartment;
    a storage container configured to store the removable seat and positioned within the automobile compartment away from the seat installation support;
    a first guide structure for guiding the removable seat from the seat installation support to an intermediate position between the seat installation support and the storage container, and
    a second guide structure for guiding the removable seat from the intermediate position to the storage container, wherein
    the seat installation support and the storage container are arranged within the automobile compartment such that the removable seat is guided by both of the first guide structure and the second guide structure when the removable seat is positioned at the intermediate position.

2. The structure for storing the seat for the automobile according to claim 1, wherein
    the removable seat is an auxiliary seat configured to be disposed at a side portion of a basic seat positioned in a seat row, the auxiliary seat having a seat cushion and a seat back, and the seat back being configured to be foldable onto the seat cushion, the seat cushion of the auxiliary seat is attachably detachable from the seat installation support which is integrally movable with the basic seat.

3. The structure for storing the seat for the automobile according to claim 1, wherein at least two rows of seats are arranged in front and rear directions within the automobile compartment, and side seats are respectively disposed in left and right directions relative to the front and rear directions at each row of seats, the removable seat is disposed between side seats of a rear row of the at least two rows of seats, the storage container is disposed between side seats of a front row of the at least two rows of seats, and the removable seat disposed at the rear row and the storage container disposed at the front row are aligned with one another in a vehicle width direction such that the removable seat is movable between the storage container and the seat installation support.

4. The structure for storing the seat for the automobile according to claim 3, wherein the storage container includes an inlet opening facing the rear row and configured to receive the removable seat into the storage container, and the inlet opening includes a pivotable lid for opening and closing the inlet opening, the pivotable lid being configured to contact the floor within the automobile compartment and the removable seat to and from the storage compartment.

5. The structure for storing the seat for the automobile according to claim 1, wherein the removable seat is configured to have a width in a vehicle width direction of the automobile compartment such that a passenger can pass therethrough when the removable seat is detached from the seat installation support.

6. The structure for storing the seat for the automobile according to claim 1, further comprising:

a seat attaching and detaching mechanism configured to attach and detach the removable seat to and from the seat installation support, the seat attaching and detaching mechanism including first engaging means and second engaging means each provided at both the seat installation support and a lower face side of the removable seat, the first engaging means and the second engaging means provided at the seat installation support and being positioned at a rear side portion and a front side portion of the seat installation support, respectively, and the second engaging means is configured to be releasable based on an operation of the first engaging means provided at the removable seat in a direction for releasing engagement.

7. The structure for storing the seat for the automobile according to claim 6, wherein the first engaging means and the second engaging means disposed at the seat installation support side of the seat attaching and detaching mechanism are configured as receivers for receiving the first engaging means and the second engaging means disposed at the removable seat side, the first engaging means and the second engaging means being configured as pin members.

8. The structure for storing the seat for the automobile according to claim 6, wherein a releasing engagement direction of the first engaging means is different from a releasing engagement direction of the second engaging means.

9. The structure for storing the seat for the automobile according to claim 8, wherein the releasing engagement direction of the first engaging means of the seat attaching and detaching mechanism is a generally vertical direction, and the releasing engagement direction of the second engaging means is generally oblique to the releasing engagement direction of the first engaging means.

10. The structure for storing the seat for the automobile according to claim 6, wherein the first engaging means of the seat attaching and detaching mechanism is a lock configured to require an independent releasing operation, and the second engaging means is an engaging mechanism including complimentary recesses and pins.

11. The structure for storing the seat for the automobile according to claim 10, wherein the first engaging means of the seat attaching and detaching mechanism is arranged on a rear side of the removable seat and the seat installation support in a vehicle front and rear direction, the second engaging means is arranged on a front side of the removable seat and the seat installation support in the vehicle front and rear direction, respectively, and when the first engaging means are disengaged, the second engaging means is configured to be released from engagement by lifting and moving operation of the rear side of the removable seat towards the front side of the removable seat.

12. The structure for storing the seat for the automobile according to claim 6, wherein the seat attaching and detaching mechanism includes a third engaging means comprising an engaging pin and an engaging hole, and an inner peripheral face of the engaging hole is shaped to engage and guide the engaging pin when the removable seat is mounted to the seat installation support.

13. The structure for storing the seat for the automobile according to claim 6, wherein the first engaging means include a striker engageable with a lock apparatus, the striker being provided at the removable seat and the lock apparatus being provided at the seat installation support.

14. The structure for storing the seat for the automobile according to claim 13, wherein the second engaging means include at least one locking pin engageable with at least one locking recess portion, the at least one locking pin being provided at the removable seat and the at least one locking recess portion being provided at the seat installation support.

* * * * *

UNITED STATES PATENT AND TRADEMARK OFFICE
CERTIFICATE OF CORRECTION

| | |
|---|---|
| PATENT NO. | : 8,336,942 B2 |
| APPLICATION NO. | : 12/525231 |
| DATED | : December 25, 2012 |
| INVENTOR(S) | : H. Yamashita et al. |

It is certified that error appears in the above-identified patent and that said Letters Patent is hereby corrected as shown below:

Column 31, line 30, please change "and the removable" to --and guide the removable--.

Signed and Sealed this
Ninth Day of April, 2013

Teresa Stanek Rea
*Acting Director of the United States Patent and Trademark Office*